US011665537B2

(12) United States Patent
Amin et al.

(10) Patent No.: US 11,665,537 B2
(45) Date of Patent: May 30, 2023

(54) SECURE RICH COMMUNICATION SERVICES MULTICAST SYSTEM

(71) Applicant: T-Mobile USA, Inc., Bellevue, WA (US)

(72) Inventors: Rahul Amin, Issaquah, WA (US); Joel Arends, Renton, WA (US); Fadi Banna, Kirkland, WA (US); Sheraz Dar, Maple Valley, WA (US); Zakir Hussain Syed, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/713,106

(22) Filed: Apr. 4, 2022

(65) Prior Publication Data

US 2022/0303764 A1 Sep. 22, 2022

Related U.S. Application Data

(63) Continuation of application No. 16/265,719, filed on Feb. 1, 2019, now Pat. No. 11,297,494.

(51) Int. Cl.
*H04W 12/033* (2021.01)
*H04L 9/08* (2006.01)
(Continued)

(52) U.S. Cl.
CPC ......... *H04W 12/033* (2021.01); *H04L 9/0869* (2013.01); *H04L 12/185* (2013.01);
(Continued)

(58) Field of Classification Search
CPC .................................................. H04W 12/033
See application file for complete search history.

(56) References Cited

U.S. PATENT DOCUMENTS 11,128,485 B2 9/2021 Amin et al.
11,297,494 B2 4/2022 Amin et al.
(Continued)

FOREIGN PATENT DOCUMENTS

CN 104618110 4/2018
EP 2482513 8/2012

OTHER PUBLICATIONS

International Search Report and Written Opinion for International Application No. PCT/US2020/015900, Notification dated May 8, 2020.
(Continued)

*Primary Examiner* — Bradley W Holder
(74) *Attorney, Agent, or Firm* — Knobbe Martens Olson & Bear LLP

(57) ABSTRACT

An improved telecommunications network that can reduce the network load on a rich communication services (RCS) server and/or local routers that implement 1-to-N and/or M-to-N services is described herein. In particular, the improved telecommunications network may include an improved RCS server that can route secure multicast messages instead of and/or in addition to unicast messages. For example, the improved RCS server can create a multicast group for a group of UEs in response to a request from a UE to create a group of UEs. Creation of the multicast group may include creating a shared multicast group key (SMGK) for the multicast group and/or selecting a security algorithm for the multicast group. The improved RCS server can then distribute the SMGK and/or the selected security algorithm to the UEs such that the UEs can use the SMGK and/or the selected security algorithm to encrypt and/or decrypt messages.

20 Claims, 12 Drawing Sheets

(51) Int. Cl.
*H04L 12/18* (2006.01)
*H04L 9/40* (2022.01)
*H04W 12/04* (2021.01)
*H04L 9/06* (2006.01)

(52) U.S. Cl.
CPC ........ *H04L 12/189* (2013.01); *H04L 63/0428* (2013.01); *H04L 63/065* (2013.01); *H04W 12/04* (2013.01); *H04L 9/0643* (2013.01)

(56) References Cited

U.S. PATENT DOCUMENTS

| | | |
|---|---|---|
| 2008/0028211 A1 | 1/2008 | Tanizawa et al. |
| 2011/0032832 A1 | 2/2011 | Jalali et al. |
| 2012/0176953 A1 | 7/2012 | Chao et al. |
| 2012/0225652 A1 | 9/2012 | Martinez et al. |
| 2014/0057667 A1* | 2/2014 | Blankenship ......... H04W 8/005 455/500 |
| 2014/0215078 A1* | 7/2014 | Seth .................... H04L 67/1078 709/226 |
| 2016/0149836 A1* | 5/2016 | Narayanan ............. H04L 67/01 709/206 |
| 2017/0070543 A1* | 3/2017 | Balasubramanian ....................... H04W 8/082 |
| 2020/0252228 A1 | 8/2020 | Amin et al. |
| 2020/0252792 A1 | 8/2020 | Amin et al. |
| 2022/0006660 A1 | 1/2022 | Amin et al. |

OTHER PUBLICATIONS

International Search Report and Written Opinion for International Application No. PCT/US2020/015903, Notification dated May 29, 2020.

* cited by examiner

UE STATE TABLE 700

| UE ID | MULTICAST GROUP IP | UNICAST IP | SECURED MEMBER? | ENCRYPTION ALGORITHM | SMGK |
|---|---|---|---|---|---|
| 1111@1.1.1.1 | 225.1.1.1 | N/A | YES | ALGORITHM #1 | KEY #1 |
| 2222@2.2.2.2 | 225.1.1.1 | N/A | YES | ALGORITHM #1 | KEY #1 |
| 3333@3.3.3.3 | N/A | 3.3.3.3 | NO | N/A | N/A |

*Fig. 7*

SECURE RICH COMMUNICATION SERVICES MULTICAST SYSTEM

CROSS-REFERENCE TO RELATED APPLICATIONS

This application is a continuation of U.S. patent application Ser. No. 16/265,719, entitled "SECURE RICH COMMUNICATION SERVICES MULTICAST SYSTEM" and filed on Feb. 1, 2019, issued as U.S. Pat. No. 11,297,494, the entirety of which is hereby incorporated herein by reference.

BACKGROUND

A core network (also known as network core or backbone network) is the central part of a telecommunications network that provides various services to telecommunication devices, often referred to as user equipment ("UE"), that are connected by access network(s) of the telecommunications network. For example, provided services can include short message service (SMS), multimedia messaging service (MMS), instant messaging, group chat, audio and/or video conference calls, webcasts, live television streaming, multisource live streaming, and/or the like.

For some services, such as webcasts and/or live television streaming, one UE may be a source of the content, and the content may be distributed to a plurality of other UEs. For other services, such as group chat, audio and video conference calls, and/or multisource live streaming, any of a first plurality of UEs may be a source of the content, and the content may be distributed to a second plurality of UEs. The telecommunications network may operate well for these services when the number of UEs that act as a source or destination of the content is limited. However, performance of the telecommunications network may begin to degrade as the number of UEs that act as a source or destination of the content begins to grow above a certain threshold.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 7 illustrates an example multicast group capabilities state table, according to one embodiment.

DETAILED DESCRIPTION

Figure 1:
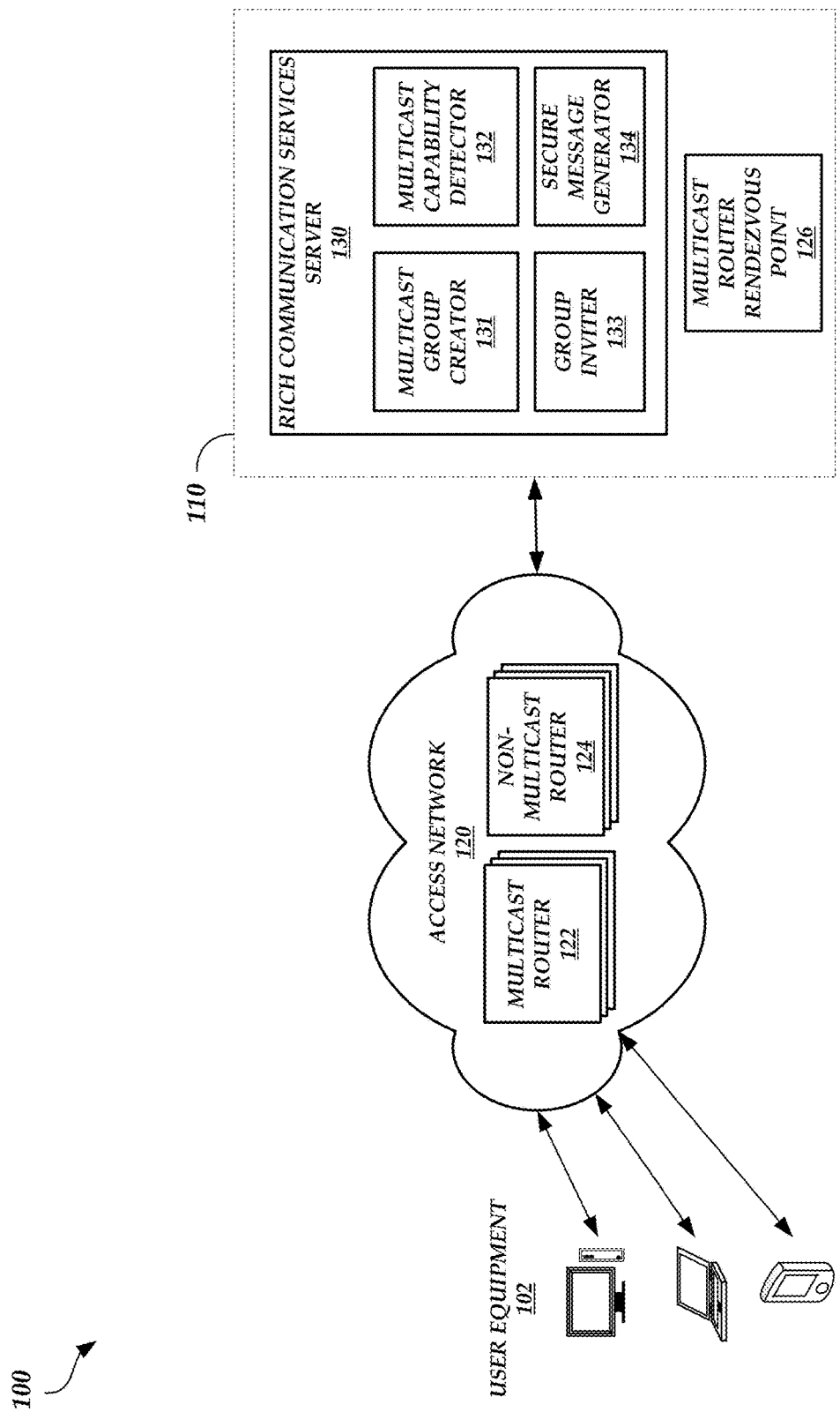
FIG. 1 is a block diagram of an illustrative secure multicast environment in which a rich communication services (RCS) server in a core network routes unicast and/or multicast messages between UEs via an access network.

As described above, the telecommunications network may operate well for certain services, such as webcasts, live television streaming, group chat, audio and video conference calls, and/or multisource live streaming, when the number of UEs that act as a source or destination of the content is limited. However, performance of the telecommunications network may begin to degrade as the number of UEs that act as a source or destination of the content begins to grow above a certain threshold. This is partly due to the manner in which communications are sent.

For example, the core network may include a rich communication services (RCS) server. The RCS server may enable some or all the services described above by routing communications from one or more UEs to one or more UEs. For 1-to-1 services (e.g., SMS), the typical RCS server routes unicast messages between UEs given that one UE acts as a source and one UE acts as a destination. However, even for 1-to-N services (e.g., services like webcasts, live television streaming, etc. where one UE is a source of content and N UEs receive the content) and/or M-to-N services (e.g., services like group chat, audio and video conference calls, multisource live streaming, etc. where any of M UEs can be a source of content and N UEs receive the content), the typical RCS server routes unicast messages between UEs. The typical RCS server often uses unicast messages even for 1-to-N services and/or M-to-N services because the local routers in the core and/or access networks with which UEs communicate to send or receive messages may not be able to handle non-unicast messages (e.g., multicast messages). Furthermore, some UEs may not be equipped to handle non-unicast messages (e.g., multicast messages).

Routing unicast messages between UEs when implementing a 1-to-N or M-to-N service can be problematic. For example, one UE may use a particular service to send a message intended for N other UEs. To implement the service, the typical RCS server replicates this message to form N unicast messages, and then routes the N unicast messages to the various N UEs. As the number N increases, the number of unicast messages the typical RCS server has to replicate and transmit and/or the local routers have to transmit increases as well. The typical RCS server and the local routers present in the access and/or core network have a finite amount of processing power, and therefore can only handle so many messages at one time. Thus, situations can occur in which the number of unicast messages to be routed by the typical RCS server and/or by a local router is greater than the respective device's capacity. Transmission delays can result, which can potentially affect the user experience (e.g., for services that are time-sensitive, such as audio conference calls, video conference calls, live television streaming, multisource live streaming, etc.). The increased network load caused by the replication and/or transmission of these unicast messages can also delay the processing of messages associated with other services offered by the telecommunications network, thereby negatively affecting the performance of these other services.

Accordingly, described herein is an improved telecommunications network that can reduce the network load on an RCS server and/or local routers that implement 1-to-N and/or M-to-N services. In particular, the improved telecommunications network may include an improved RCS server that can route multicast messages instead of and/or in addition to unicast messages. For example, the improved RCS server can create a multicast group for a group of UEs in response to a request from a UE to create a group of UEs. Creation of the multicast group may include assigning a group Internet protocol (IP) address to the multicast group. The improved RCS server can then determine capabilities of the UEs in the multicast group. For example, the improved RCS server can determine which of the UEs is capable of transmitting and/or receiving multicast messages and/or is associated with a local router capable of transmitting and/or receiving multicast messages.

When a first UE transmits a message to the multicast group IP address, the improved RCS server can multicast the message to the UEs capable of receiving multicast messages and can unicast the message to the UEs not capable of receiving multicast messages. For example, the improved RCS server can replicate the message transmitted by the first UE to form M unicast message(s), where M represents the number of UEs in the multicast group that are incapable of receiving multicast messages (e.g., where M can be any integer 0 or above). The improved RCS server can then route the M unicast message(s) to local router(s) such that each UE in the multicast group incapable of receiving multicast messages receives one of the M unicast message(s).

In addition, the improved RCS server can generate a single multicast version of the message transmitted by the first UE, and transmit that one multicast message to local router(s) with which UEs capable of receiving multicast message communicate. The local router(s) can then route the one multicast message to each UE capable of receiving multicast messages. As an illustrative example, if two UEs capable of receiving multicast messages communicate with the same local router, the improved RCS server may route a single multicast message to the local router. The local router may then route the one multicast message to both UEs. This is in contrast to the typical RCS server that uses unicast messaging. In the same situation, the typical RCS server would route two unicast messages to the local router, and the local router would then route one of the unicast messages to one of the UEs and the other unicast message to the other UE.

Accordingly, the improved RCS server can reduce the number of messages transmitted over the core and/or access network by using multicast messaging techniques. This can help reduce the likelihood that the RCS server or a local router is tasked with processing a larger number of messages than can be handled at any one time, thereby reducing transmission delays and improving the performance of services offered in the telecommunications network.

Multicast messages, however, may pose a security risk. For example, any UE can join a multicast group if the multicast group identifier or address (e.g., multicast IP address) is known by the UE, regardless of whether the UE that initiated creation of the multicast group invited the UE. Thus, any UE with knowledge of the multicast group identifier or address can access messages or other data transmitted to members of the multicast group. In fact, any UE with this knowledge can access messages or other data transmitted to members of the multicast group without members of the multicast group being aware of the unauthorized access.

Unauthorized access to multicast group data may be preventable in use cases in which one or just a few UEs are the source of content (e.g., live television streaming). For example, the source UE(s) can encrypt the source content using an encryption key and/or security algorithm, and distribute the encryption key and/or security algorithm to members of the multicast group that are authorized recipients of the content such that the authorized recipients can decrypt the content using the distributed encryption key and/or security algorithm.

However, unauthorized access to multicast group data may be a concern in use cases in which many UEs are the source and/or destination of content (e.g., group chat, audio and/or video conference calls, webcasts, multisource live streaming, etc.). For example, each UE in a multicast group may have a unique security key (e.g., encryption key) that the respective UE can use to encrypt data transmitted to other members of the multicast group. If a source UE uses a security key to encrypt transmitted data, then other UEs that are members of the multicast group may need access to the security key in order to decrypt the transmitted, encrypted data. The other UEs that are members of the multicast group can gain access to the source UE's security key by having the source UE distribute the security key to the multicast group members. This process becomes impractical, inefficient, resource intensive, and/or unsecure, however, if many UEs in the multicast group can act as source UEs. If many UEs in the multicast group act as source UEs, then each UE in the multicast group may have to obtain and manage a large number of security keys. As UEs join or leave the multicast group, the distribution of security keys may need to be updated accordingly (e.g., each UE in the multicast group may transmit the respective UE's security key to a UE that just joined the multicast group, and the UE that just joined the multicast group may transmit the UE's security key to the existing members of the multicast group). Thus, the distribution and management of security keys may involve extra transmissions (e.g., in the control plane) separate from the data or content transmissions, which can reduce the available network bandwidth (e.g., reduce the network throughput or data rate of data transmissions, thereby contributing to increased transmission latency), reduce the amount of UE processing capabilities that can be allocated to data transmissions or other operations, and/or the like. In addition, the larger number of UEs that have a given UE's security key, the more susceptible the security key is to being compromised. If a UE's security key becomes compromised, an unauthorized UE could spoof the UE with the compromised security key, potentially gaining access to the multicast group data.

Accordingly, the improved RCS server can create a unique shared key (e.g., a shared multicast group key) for the multicast group when creating the multicast group. The improved RCS server can then share the shared key with all of the UEs in the multicast group and/or the UEs that are capable of handling multicast messages. A first UE that intends to transmit a message to the multicast group can first encrypt the message using the shared key. The first UE can then transmit the encrypted message to the multicast group IP address, and the improved RCS server can multicast the encrypted message to the UEs capable of receiving multicast messages and can unicast an unencrypted version of the message to the UEs not capable of receiving multicast messages. The UEs capable of receiving multicast messages that receive the encrypted message can then decrypt the message using the shared key.

Thus, the improved RCS server can perform operations to provide secure multicast communications, allowing the UEs to avoid having to perform key distribution and management operations. Rather, the improved RCS server can create and distribute a security key shared by some or all of the UEs that are members of a multicast group. Not only can the improved RCS server reduce the number of transmissions within the multicast group by distributing a shared key to the UEs in the multicast group rather than having each UE in the multicast group transmit security keys to all other members in the multicast group (e.g., N transmissions instead of N*(N−1) transmissions, where N is the number of UEs in the multicast group), the improved RCS server can further reduce the number of transmissions within the multicast group by distributing the shared key in an invite message already sent during the multicast group creation process, as described in greater detail below. Accordingly, the improved RCS server can provide secure multicast communications without negatively impacting network bandwidth availability, UE processing capabilities, and/or the like, thereby reducing transmission delays and improving the performance of services offered in the telecommunications network.

The foregoing aspects and many of the attendant advantages of this disclosure will become more readily appreciated as the same become better understood by reference to the following detailed description, when taken in conjunction with the accompanying drawings.

Example Multicast Environment

FIG. 1 is a block diagram of an illustrative secure multicast environment 100 in which a rich communication services (RCS) server 130 in a core network 110 routes unicast and/or multicast messages between UEs 102 via an access network 120. The access network 120 includes one or more multicast routers 122 and/or one or more non-multicast routers 124. The core network 110 includes a multicast router rendezvous point 126. While not shown, the core network 110 may optionally include one or more multicast routers and/or one or more non-multicast routers, and the access network 120 may optionally include a multicast router rendezvous point.

The UE 102 can be any computing device, such as a desktop, laptop or tablet computer, personal computer, wearable computer, server, personal digital assistant (PDA), hybrid PDA/mobile phone, electronic book reader, appliance (e.g., refrigerator, washing machine, dryer, dishwasher, etc.), integrated component for inclusion in computing devices, home electronics (e.g., television, set-top box, receiver, etc.), vehicle, machinery, landline telephone, network-based telephone (e.g., voice over Internet protocol ("VoIP")), cordless telephone, cellular telephone, smart phone, modem, gaming device, media device, control system (e.g., thermostat, light fixture, etc.), and/or any other type of Internet of Things (IoT) device or equipment. In an illustrative embodiment, the UE 102 includes a wide variety of software and hardware components for establishing communications over one or more communication networks, including the access network 120, the core network 110, and/or other private or public networks. For example, the UE 102 may include a subscriber identification module (SIM) card (e.g., an integrated circuit that stores data to identify and authenticate a UE that communicates over a telecommunications network) and/or other component(s) that enable the UE 102 to communicate over the access network 120, the core network 110, and/or other private or public networks via a radio area network (RAN) and/or a wireless local area network (WLAN). The SIM card may be assigned to a particular user account.

The UEs 102 are communicatively connected to the core network 110 via the access network 120, such as GSM EDGE Radio Access Network (GRAN), GSM EDGE Radio Access Network (GERAN), Universal Terrestrial Radio Access Network (UTRAN), Evolved Universal Terrestrial Radio Access (E-UTRAN), and/or the like. Illustratively, the access network 120 is distributed over land areas called cells, each served by at least one fixed-location transceiver, known as a cell site or base station. The base station provides the cell with the network coverage which can be used for transmission of voice, messages, or other data. A cell might use a different set of frequencies from neighboring cells, to avoid interference and provide guaranteed service quality within each cell. When joined together these cells provide radio coverage over a wide geographic area. This enables a large number of UEs 102 to communicate via the fixed-location transceivers.

The multicast routers(s) 122 and/or the non-multicast router(s) 124 may communicate with the cell site or base station to communicatively connect the UEs 102 to the core network 110. For example, the multicast routers(s) 122 and/or the non-multicast router(s) 124 may be located inside or outside a cell. The multicast router(s) 122 may be configured to route multicast messages to and/or from UEs 102 capable of sending and/or receiving multicast messages and/or to and/or from the RCS server 130. A multicast router 122 may be local to one or more UEs 102 capable of sending and/or receiving multicast messages. For example, if a multicast router 122 is local to a UE 102, the multicast router 122 is designated as the component that the UE 102 communicates with to send and/or receive multicast messages. In addition, the UE 102 may send a message to its local multicast router 122 to join a multicast group of which the UE 102 is a member. The UE 102 and its local multicast router 122 may optionally be in the same geographic region.

A multicast router 122 may also be local to the RCS server 130. For example, the multicast router 122 local to the RCS server 130 may work with the RCS server 130 to create a multicast group. The RCS server 130 may also send a message to its local multicast router 122 to join a multicast group created by the RCS server 130 and/or the local multicast router 122.

The non-multicast router(s) 124 may not be capable of routing multicast messages to and/or from UEs 102. Rather, the non-multicast router(s) 124 may be configured to route unicast messages to and/or from UEs 102. A non-multicast router 124 may be local to one or more UEs 102 incapable of sending and/or receiving multicast messages. For example, if a non-multicast router 124 is local to a UE 102, the non-multicast router 124 is designated as the component that the UE 102 communicates with to send and/or receive unicast messages. The UE 102 and its local non-multicast router 124 may optionally be in the same geographic region.

The multicast router(s) 122, the non-multicast router(s) 124, and/or other routers in the access network 120 and/or the core network 110 may form a tree of routers that route messages from the RCS server 130 to the UEs 102 and from a UE 102 to the RCS server 130. For example, some of the multicast router(s) 122 and the non-multicast router(s) 124 (e.g., those routers local to a UE 102) may be leafs in the router tree because these routers 122 and/or 124 communicate messages to and/or from UEs 102. Other multicast router(s) 122 and non-multicast router(s) 124 (e.g., those not local to a UE 102) may be configured to route messages between routers so that the messages ultimately reach a UE 102 or the RCS server 130. The multicast router rendezvous point 126 may be a router at the root of the router tree, such that all messages transmitted by a UE 102 arrive at the multicast router rendezvous point 126 and all messages transmitted by the RCS server 130 pass through the multicast router rendezvous point 126 for distribution to one or more of the multicast router(s) 122, the non-multicast router(s) 124, and/or other router(s) in the access network 120 and/or the core network 110. The multicast router rendezvous point 126 may send messages transmitted by a UE 102 to the RCS server 130 and may receive messages transmitted by the RCS server 130 for distribution to other routers.

Although the access network 120 is illustrated as a single network, one skilled in the relevant art will appreciate that the access network can include any number of public or private communication networks and/or network connections.

The core network 110 provides various services to UEs 102 that are connected via the access network 120. One of the main functions of the core network 110 is to route telephone calls, messages, and/or other data across a public switched telephone network (PSTN) or Internet protocol (IP) Multimedia Subsystem (IMS). For example, the core network 110 may include a call routing system, which routes telephone calls, messages, and/or other data across a PSTN or IMS. The core network 110 may provide high capacity communication facilities that connect various nodes implemented on one or more computing devices, allowing the nodes to exchange information via various paths. As described herein, the core network 110 can provide services such as SMS, MMS, instant messaging, group chat, audio and/or video conference calls, webcasts, live television streaming, multisource live streaming, and/or the like.

In an embodiment, the RCS server 130 uses session initiation protocol (SIP) for control plane messages and application-specific protocols, such as real-time transport protocol (RTP) and/or message session relay protocol (MSRP), for media plane messages. Control plane messages are generally unicast messages. Media plane messages can be unicast or multicast messages.

As illustrated in FIG. 1, the RCS server 130 may include several components, such as a multicast group creator 131, a multicast capability detector 132, a group inviter 133, and a secure message generator 134. In an embodiment, the multicast group creator 131 is configured to create a multicast group in response to a request from a UE 102 transmitted over the control plane. For example, a UE 102 may send a SIP invite to request the creation of a new group. The UE 102 may request the creation of a new group when the UE 102 intends to send a message to the group over the media plane. The SIP invite may include an address corresponding to the RCS server 130 in the destination field, an address (e.g., IP address) of the UE 102 in the source field, and an indication of UEs 102 that are to be members of the group (e.g., IP addresses of the UEs 102 that are to be members of the group, identifiers of the UEs 102 that are to be members of the group, etc.) in an extensible markup language (XML) resource list field. The multicast group creator 131 can receive the request (e.g., the SIP invite) and validate that the UEs 102 indicated in the request to be members of the group are registered with the telecommunications network. For example, the multicast group creator 131 can send information identifying the UEs 102 indicated in the request to be members of the group to an authentication service, not shown, and the authentication service can return an indication of whether the UEs 102 are registered or not registered with the telecommunications network.

If the UEs 102 are validated as being registered with the telecommunications network, the multicast group creator 131 can create a multicast group and assign an address (e.g., an IP address) to the multicast group. In addition, the multicast group creator 131 can create a shared key (e.g., a shared multicast group key (SMGK)) for the multicast group and select a security algorithm (e.g., an encryption algorithm) to be used by UEs 102 when securing messages (e.g., encrypting messages) using the shared key. For example, the multicast group creator 131 can apply a function to at least the multicast group address and a random number (e.g., generated by a random number generator) to create the SMGK. Such functions can include concatenation (e.g., appending the random number to the front or end of the multicast group address), multiplication, modulo, a hash function (e.g., SHA-256, SHA-512, etc., which takes the random number and multicast group address as inputs), etc. Alternatively, the multicast group creator 131 can apply a function to the multicast group address and one of a non-random number or a pseudorandom number. Thus, the SMGK created by the multicast group creator 131 for a multicast group may be unique to the multicast group. The selected security algorithm can be any encryption or security algorithm, such as advanced encryption standard (AES), data encryption standard (DES), Rivest cipher 6 (RC6), etc. Optionally, the multicast group creator 131 can send traffic to the multicast group until members join the multicast group.

The multicast group creator 131 can then notify the multicast router 122 local to the RCS server 131 that a multicast group has been created, and the local multicast router 122 can then inform the multicast router rendezvous point 126 that the multicast group has been created. For example, the local multicast router 122 can transmit a protocol independent multicast (PIM) register to the multicast router rendezvous point, where the PIM register includes an indication of the multicast group address, the SMGK, and/or an indication of the selected security algorithm. In response to receiving the message (e.g., the PIM register) from the local multicast router 122, the multicast router rendezvous point 126 can begin routing multicast traffic to group members (if UEs 102 have already joined the multicast group) and/or can transmit PIM register-stop messages to multicast routers 122 and/or non-multicast routers 124 until a UE 102 joins the multicast group.

Alternatively, the multicast group creator 131 may not create the multicast group, assign an address to the multicast group, create the SMGK, and/or select the security algorithm. Rather, once the UEs 102 are validated, the multicast group creator 131 can instruct the local multicast router 122 to create the multicast group, assign an address to the multicast group, create the SMGK, and/or select the security algorithm. The local multicast router 122 can then inform the multicast group creator 131 of the address, SMGK, and/or selected security algorithm assigned to the multicast group.

Alternatively, the multicast group creator 131 may not create the SMGK and/or select the security algorithm.

Rather, the multicast group creator 131 may direct UEs 102 to another location to obtain the SMGK and/or an indication of the selected security algorithm. For example, the multicast group creator 131 may create a token, and distribute the token and a link to another device (e.g., an encryption key manager, an authentication system, etc.) that is distributed to UEs 102 in place of the SMGK and/or an indication of the selected security algorithm. The UE 102 can then access the link and provide the token to obtain the SMGK and/or an indication of the selected security algorithm from the other device.

The multicast group creator 131 can also transmit a message to the local multicast router 122 instructing the local multicast router 122 to join the multicast group. For example, the multicast group creator 131 can transmit an Internet group management protocol (IGMP) membership report to the local multicast router 122, where the IGMP membership report includes the multicast group address, SMGK, and/or selected security algorithm. In response, the local multicast router 122 can join the multicast group.

Once the multicast group has been created and the local multicast router 122 and the multicast router rendezvous point 126 have been contacted, the multicast group creator 131 can send an acknowledgment to the UE 102 that requested creation of the group, where the acknowledgment includes the multicast group address, the SMGK, and/or an indication of the selected security algorithm. For example, the multicast group creator 131 can transmit a 200 OK message to the UE 102, where the 200 OK message includes an address of the UE 102 in the destination field, an address of the RCS server 130 in the source field, and the multicast group address, the SMGK, and/or an indication of the selected security algorithm in a session description protocol (SDP) field.

Now that the multicast group has been created, the multicast capability detector 132 can determine the capabilities of the UEs 102 that are to be members of the multicast group. For example, the multicast capability detector 132 can probe the UEs 102 that are to be members of the multicast group to determine whether each respective UE 102 is capable of receiving and/or sending multicast messages. A UE 102 may be capable of receiving and/or sending multicast messages if the UE 102 is configured to handle multicast messages (e.g., obtain, unpack, and/or process multicast messages, generate and transmit multicast messages, etc.) and/or if the router(s) or other network components in the access network 120 and/or core network 110 with which the UE 102 communicates are configured to handle multicast messages (e.g., if the router 122 or 124 local to the UE 102 is configured to handle multicast messages). As an illustrative example, the multicast capability detector 132 can transmit SIP option messages to the UEs 102 to determine whether the UEs 102 are capable of receiving and/or sending multicast messages. A SIP option message can include an address of a UE 102 in the destination field, an address of the RCS server 130 in the source field, and a contact parameter (e.g., a +IGMP parameter) in a contact parameter field.

In response to receiving a probe from the multicast capability detector 132, a UE 102 may return a message indicating whether or not the UE 102 is capable of receiving and/or sending multicast messages. For example, the UE 102 may return a message indicating that the UE 102 is incapable of receiving and/or sending multicast messages if the UE 102 is not configured to handle multicast messages or if the router(s) or other components in the access network 120 and/or core network 110 with which the UE 102 communicates are not configured to handle multicast messages. As an illustrative example, the UE 102 can return a 200 OK message in response to the probe (e.g., the SIP option message). The 200 OK message can include an address of the UE 102 in the source field and an address of the RCS server 130 in the destination field. If the UE 102 is capable of receiving and/or sending multicast messages, then the UE 102 can also include, in the contact parameter field of the 200 OK message, the contact parameter originally included in the received SIP option message (e.g., the +IGMP parameter). Otherwise, if the UE 102 is incapable of receiving and/or sending multicast messages, then the UE 102 can leave the contact parameter field in the 200 OK message blank (e.g., without the +IGMP parameter) or insert another value (e.g., another value other than the contact parameter originally included in the received SIP option message) in the contact parameter field in the 200 OK message.

The multicast capability detector 132 can use the probe responses to classify the UEs 102 designated as being members of the multicast group. For example, the multicast capability detector 132 can classify UEs 102 incapable of receiving and/or sending multicast messages as unicast UEs 102, and can classify UEs 102 capable of receiving and/or sending multicast messages as multicast UEs 102. The multicast capability detector 132 can optionally provide these classifications to the group inviter 133.

The operations performed by the multicast capability detector 132 are optional. For example, the RCS server 130 may not probe UEs 102 to determine which UEs 102 are capable of receiving and/or sending multicast messages. Rather, the RCS server 130 may directly invite all UEs 102 that are indicated as being members of the multicast group to join the multicast group, as described below.

The group inviter 133 can use the classifications to invite UEs 102 to join the multicast group. For example, the group inviter 133 can transmit one set of invitations to multicast UEs 102 and another set of invitations to unicast UEs 102. The invitations sent to the multicast UEs 102 may cause the multicast UEs 102 to join the multicast group created by the RCS server 130, and the invitations sent to the unicast UEs 102 may cause the unicast UEs 102 to provide an address for receiving a unicast message when a message is sent to the multicast group. As an illustrative example, an invitation sent by the group inviter 133 to a multicast UE 102 may be a SIP invite message. The SIP invite message may include an address of the multicast UE 102 in the destination field, an address of the RCS server 130 in the source field, and the multicast group address, the SMGK, and the selected security algorithm in the SDP field. An invitation sent by the group inviter 133 to a unicast UE 102 may also be a SIP invite message. Here, the SIP invite message may include an address of the unicast UE 102 in the destination field, an address of the RCS server 130 in the source field, and an address of the unicast UE 102 in the SDP field (e.g., an SDP unicast IP address).

In response to receiving an invitation from the group inviter 133, a multicast UE 102 may invite a multicast router 122 local to the multicast UE 102 to join the multicast group. For example, the multicast UE 102 may transmit an IGMP membership report to the local multicast router 122, where the IGMP membership report includes an indication of the multicast group address, the SMGK, and/or an indication of the selected security algorithm. Receipt of the invitation to join the multicast group may cause the local multicast router 122 to join the multicast group. Furthermore, in response to receiving the invitation from the group inviter 133, the multicast UE 102 may transmit an acknowledgment to the group inviter 133. For example, the acknowledgment may be a 200 OK message that includes an address of the multicast UE 102 in the source field, an address of the RCS server 130 in the destination field, and the multicast group address, the SMGK, and/or an indication of the selected security algorithm in the SDP field.

In response to receiving an invitation from the group inviter 133, a unicast UE 102 may transmit an acknowledgment to the group inviter 133. For example, the acknowledgment may be a 200 OK message that includes an address of the unicast UE 102 in the source field, an address of the RCS server 130 in the destination field, and the address of the unicast UE 102 (e.g., an SDP unicast IP address) in the SDP field.

If, however, the multicast capability detector 132 does not probe the UEs 102 to determine which UEs 102 are capable of receiving and/or sending multicast messages, the group inviter 133 can transmit one set of invitations to all UEs 102. As an illustrative example, these invitations may be SIP invite messages that include an address of the multicast UE 102 in the destination field, an address of the RCS server 130 in the source field, and the multicast group address, the SMGK, and the selected security algorithm in the SDP field (e.g., such that the SDP "Connection Data" field in the SIP invite message, where "Connection Data" is represented as "c=", is as follows: c=<nettype> <addrtype> <connection-address> <encryption/security algorithm> <shared key>). In response to receiving an invitation from the group inviter 133, a UE 102 may determine whether the UE 102 supports the security algorithm or otherwise is capable of encrypting and/or decrypting messages using the SMGK. If the UE 102 supports the security algorithm or otherwise is capable of encrypting and/or decrypting messages using the SMGK, the UE 102 can transmit an acknowledgment to the group inviter 133 indicating that the SMGK and/or selected security algorithm are accepted. The acknowledgment may be a 200 OK message that includes an address of the multicast UE 102 in the source field, an address of the RCS server 130 in the destination field, and the multicast group address, the SMGK, and/or an indication of the selected security algorithm in the SDP field. The group inviter 133 may classify a UE 102 that accepts the SMGK and/or selected security algorithm as a multicast UE.

However, if the UE 102 does not support the security algorithm or is otherwise incapable of encrypting and/or decrypting messages using the SMGK, the UE 102 can transmit an acknowledgement to the group inviter 133 indicating that the SMGK and/or selected security algorithm are not accepted. The acknowledgement may be a 200 OK message that includes an address of the unicast UE 102 in the source field, an address of the RCS server 130 in the destination field, and the address of the unicast UE 102 (e.g., an SDP unicast IP address) in the SDP field. The group inviter 133 may classify a UE 102 that does not accept the SMGK and/or selected security algorithm as a unicast UE.

Thus, in an embodiment, a UE 102 may accept the invite transmitted by the group inviter 133 (and therefore be classified as a multicast UE) if the UE 102 is capable of receiving and/or sending multicast messages and if the UE 102 supports the security algorithm or otherwise is capable of encrypting and/or decrypting messages using the SMGK. A UE 102 may decline the invite transmitted by the group inviter 133 (and therefore be classified as a unicast UE) if the UE 102 is incapable of receiving and/or sending multicast messages or if the UE 102 does not support the security algorithm or otherwise is incapable of encrypting and/or decrypting messages using the SMGK.

In another embodiment, a UE 102 may accept the invite transmitted by the group inviter 133 (and therefore be classified as a multicast UE) if the UE 102 supports the security algorithm or otherwise is capable of encrypting and/or decrypting messages using the SMGK. A UE 102 may decline the invite transmitted by the group inviter 133 (and therefore be classified as a unicast UE) if the UE 102 does not support the security algorithm or otherwise is incapable of encrypting and/or decrypting messages using the SMGK.

In another embodiment, a UE 102 may accept the invite transmitted by the group inviter 133 (and therefore be classified as a multicast UE) if the UE 102 is capable of receiving and/or sending multicast messages. A UE 102 may decline the invite transmitted by the group inviter 133 (and therefore be classified as a unicast UE) if the UE 102 is incapable of receiving and/or sending multicast messages.

Any of the invite messages described herein as being transmitted by the group inviter 133 to the UEs 102 can include additional information. For example, in addition to the SMGK and/or an indication of the selected security algorithm, an invite message can include other security parameters. As an illustrative example, the SDP field in the SIP invite message can include one or more additional security keys (e.g., so that the UE 102 can select one of the security keys to use when encrypting or decrypting a message), one or more additional security algorithms (e.g., so that the UE 102 can select one of the security algorithms to use when encrypting or decrypting a message), a token (e.g., to be used by the UE 102 to retrieve one or more additional security parameters for use in encrypting or decrypting a message), a certificate (e.g., to be used by the UE 102 to retrieve one or more additional security parameters or to access a computing resource for use in encrypting or decrypting a message), a link (e.g., to be accessed by the UE 102 to retrieve one or more additional security parameters for use in encrypting or decrypting a message), and/or the like. As another example, the invite message can include information that allows the UE 102 to join multiple multicast groups. As an illustrative example, the SDP field in the SIP invite message can include a first set of a multicast group address, an SMGK, and a selected security algorithm (e.g., for joining a first multicast group), a second set of a multicast group address, an SMGK, and a selected security algorithm (e.g., for joining a second multicast group), and so on.

The multicast capability detector 132 and/or the group inviter 133 may use the probe results and/or received acknowledgements to generate and maintain an internal multicast group capabilities state table in which each UE 102 of a multicast group is classified as a unicast UE or a multicast UE, corresponding unicast or multicast addresses are provided, and SMGK and/or an indication of the selected security algorithm are identified. An example multicast group capabilities state table is described below with respect to FIG. 7.

Once the multicast UEs 102 and/or the unicast UEs 102 have received the invitations and transmitted acknowledgments, the UEs 102 may be members of the multicast group. While the unicast UEs 102 that are members of the multicast group may be incapable of sending and/or receiving multicast messages, the unicast UEs 102 may receive unicast messages when any UE 102 that is a member of the multicast group sends a message to the multicast group. Likewise, if a unicast UE 102 transmits a unicast message to the multicast group, unicast UEs 102 that are members of the multicast group may receive unicast messages and multicast UEs 102 that are members of the multicast group may receive multicast messages. This functionality may be enabled by the secure message generator 134.

The secure message generator 134 may be configured to generate a secure multicast message in response to receiving a message from a UE 102 that is intended for the multicast group, and may be configured to replicate a message received from a UE 102 that is intended for the multicast group to form one or more unicast messages. For example, a multicast UE 102 may encrypt a message that is intended for a multicast group by applying the selected security algorithm to the message using the SMGK, and transmit the encrypted message. The encrypted message transmitted by the multicast UE 102 may initially be forwarded to the RCS server 130 (e.g., the secure message generator 134). The secure message generator 134 may query the multicast group capabilities state table to determine if the multicast group includes any unicast UEs 102. If the multicast group does not include any unicast UEs 102, then the secure message generator 134 may generate an encrypted multicast message using the encrypted message received from the UE 102 and forward the encrypted multicast message to the multicast router rendezvous point 126. In some embodiments, the encrypted multicast message may be different than the encrypted message (e.g., the encrypted multicast message may have different data fields, a different preamble, etc.). Thus, the secure message generator 134 may decrypt the encrypted message using the SMGK and/or the selected security algorithm, convert the decrypted message into a multicast message, and encrypt the multicast message using the SMGK and/or the selected security algorithm. In other embodiments, the encrypted message is the same as the encrypted multicast message, and thus the secure message generator 134 does not perform any decryption or encryption operations. Rather, the secure message generator 134 can simply forward the encrypted message received from the UE 102 to the multicast router rendezvous point 126. The multicast router rendezvous point 126 may then distribute the encrypted multicast message for reception by one or more multicast routers 122 that are local to the multicast UEs 102 that are members of the multicast group. In particular, each multicast router 122 may receive a single encrypted multicast message regardless of the number of multicast UEs 102 that are local to the multicast router 122. These local multicast router(s) 122 may then transmit the encrypted multicast message to the multicast UEs 102 to complete the message transmission.

If the multicast group does include one or more unicast UEs 102, then the secure message generator 134 can replicate the encrypted message received from the UE 102 a number of times that matches the number of unicast UEs 102 that are members of the multicast group to form one or more unicast messages. For example, the secure message generator 134 can decrypt the encrypted message, and replace the decrypted message a number of times that matches the number of unicast UEs 102 that are members of the multicast group to form one or more unicast messages. Thus, if there are X unicast UEs 102 that are members of the multicast group, then the secure message generator 134 generates X unicast messages. The secure message generator 134 also generates a single encrypted multicast message using the encrypted message received from the UE 102 if the message received from the UE 102 is not otherwise an encrypted multicast message (in which case the secure message generator 134 could use the encrypted message received from the UE 102 as an encrypted multicast message and simply forward the encrypted message received from the UE 102 to the multicast router rendezvous point 126) and if one or more multicast UEs 102 are members of the multicast group. The secure message generator 134 can then transmit the unicast message(s) and the single encrypted multicast message to the multicast router rendezvous point 126.

If a unicast UE 102 transmits a message intended for a multicast group, the secure message generator 134 may receive the message before the message is forwarded to members of the multicast group. The message generator 134 can then generate one or more unicast messages (e.g., by replicating the received message) if the multicast group includes one or more unicast UEs 102 and/or can generate a single encrypted multicast message (e.g., by converting the received message into a multicast message and applying the security algorithm to the multicast message using the SMGK) if the multicast group includes one or more multicast UEs 102.

The multicast router rendezvous point 126 may then distribute the one encrypted multicast message for reception by one or more multicast routers 122 that are local to the multicast UEs 102 that are members of the multicast group, and distribute the unicast message(s) for reception by one or more non-multicast routers 124 that are local to the unicast UEs 102 that are members of the multicast group. In particular, each multicast router 122 may receive a single encrypted multicast message regardless of the number of multicast UEs 102 that are local to the multicast router 122. However, each non-multicast router 124 may receive a number of unicast messages that is equal to the number of unicast UEs 102 that are local to the non-multicast router 124. The local multicast router(s) 122 may then transmit the encrypted multicast message to the multicast UEs 102, and the local non-multicast router(s) 124 may then transmit the unicast message(s) to the unicast UEs 102 to complete the message transmission.

The messages transmitted and/or received by the multicast group creator 131, the multicast capability detector 132, and/or the group inviter 133 may be over the control plane. The messages transmitted and/or received by the secure message generator 134 may be over the media plane.

In further embodiments, the capabilities of UEs 102 may change over time. For example, a UE 102 may initially be classified as a multicast UE 102. However, the functionality of the UE 102 may change (e.g., the UE 102 no longer supports multicasting, the UE 102 no longer supports the security algorithm or is otherwise no longer capable of encrypting and/or decrypting messages using the SMGK, etc.) or network conditions may change (e.g., the router local to the UE 102 is no longer capable of handling multicast messages) such that the UE 102 is no longer capable of receiving and/or sending multicast messages and/or is no longer capable of encrypting and/or decrypting multicast messages. Likewise, a UE 102 may initially be classified as a unicast UE 102. However, the functionality of the UE 102 may change (e.g., the UE 102 now supports multicasting, the UE 102 now supports the security algorithm or is otherwise now capable of encrypting and/or decrypting messages using the SMGK, etc.) or network conditions may change (e.g., the router local to the UE 102 is now capable of handling multicast messages) such that the UE 102 is now capable of receiving and/or sending multicast messages and/or is now capable of encrypting and/or decrypting multicast messages. The multicast capability detector 132 and/or the group inviter 133 can periodically probe UEs 102 that are members of a multicast group to determine whether the classification of any particular UE 102 should change (e.g., because the UE 102 no longer supports multicasting, because the UE 102 now supports multicasting, because network conditions have changed so that multicasting is now supported, because network conditions have changed so that multicasting is now not supported, because the UE 102 now supports the security algorithm or is otherwise now capable of encrypting and/or decrypting messages using the SMGK, because the UE 102 now no longer supports the security algorithm or is otherwise now no longer capable of encrypting and/or decrypting messages using the SMGK, etc.). For example, the multicast capability detector 132 can periodically send capability requests to the UEs 102 (where the UEs 102 then respond with an indication of the current UE 102 capabilities), and/or the group inviter 133 can periodically send SIP invite messages to the UEs 102 (where the UEs 102 then respond with an acknowledgement indicating whether the security parameters (e.g., the SMGK and/or the selected security algorithm) are accepted or declined). If the multicast capability detector 132 and/or the group inviter 133 determines that the classification of a UE 102 should change, the multicast capability detector 132 and/or the group inviter 133 may update the multicast group capabilities state table accordingly. The multicast capability detector 132 may also instruct the group inviter 133 to send (or the group inviter 133 may itself send) a multicast group invitation (e.g., a SIP invite message that includes an address of the UE 102 in the destination field, an address of the RCS server 130 in the source field, and the multicast group address, the SMGK, and/or an indication of the selected security algorithm in the SDP field) to a UE 102 that the multicast capability detector 132 determines should now be classified as a multicast UE so that the UE 102 can join the multicast group as a multicast UE.

Alternatively or in addition, the secure message generator 134 may identify that the classification of a UE 102 should change. For example, a UE 102 may be classified as a multicast UE 102. However, the secure message generator 134 transmits a multicast message to the multicast UE 102, and the secure message generator 134 determines that the multicast message was not received or could not be decrypted by the UE 102 (e.g., because an acknowledgement from the multicast UE 102 was not received within a threshold period of time), then the secure message generator 134 may attempt to re-send the multicast message zero or more times. If the secure message generator 134 still determines that the multicast message was not received or could not be decrypted by the UE 102, then the secure message generator 134 determines that the multicast UE 102 is no longer capable of receiving and/or sending multicast messages and/or no longer supports the security algorithm or otherwise no longer is capable of encrypting and/or decrypting messages using the SMGK. The secure message generator 134 can then generate a unicast version of the multicast message, and transmit the unicast message to the UE 102. If the secure message generator 134 then determines that the unicast message was received, the secure message generator 134 can update the multicast group capabilities state table to indicate that this UE 102 is now a unicast UE 102.

In still further embodiments, the multicast capability detector 132 may not probe UEs 102 each time a new multicast group is to be created. For example, the multicast capability detector 132 may have previously probed a UE 102 in conjunction with the creation of a previous multicast group, and capabilities information for that UE 102 is already stored in a multicast group capabilities state table associated with the previous multicast group. Thus, instead of probing the UE 102 again, the multicast capability detector 132 can use the capabilities information stored in the multicast group capabilities state table associated with the previous multicast group to classify the UE 102 for the new multicast group. Optionally, the multicast capability detector 132 may rely on capabilities information stored in a multicast group capabilities state table associated with a previous multicast group if the capabilities information was determined within a threshold period of time.

While the secure multicast environment 100 is described herein with respect to symmetric SMGKs (e.g., the same SMGK is used to encrypt and decrypt messages), this is not meant to be limiting. For example, the RCS server 130 can generate one SMGK for encrypting messages and another SMGK for decrypting messages (e.g., asymmetric SMGKs, such as a public SMGK and a private SMGK), and distribute both SMGKs to the UEs 102 in a manner as described herein with respect to the symmetric SMGK (e.g., in the invite messages).

The RCS server 130 may be a single computing device or may include multiple distinct computing devices, such as computer servers, logically or physically grouped together to collectively operate as a server system. The components of the RCS server 130 can each be implemented in application-specific hardware (e.g., a server computing device with one or more ASICs) such that no software is necessary, or as a combination of hardware and software. In addition, the modules and components of the RCS server 130 can be combined on one server computing device or separated individually or into groups on several server computing devices. In some embodiments, the RCS server 130 may include additional or fewer components than illustrated in FIG. 1.

Example Block Diagram for Creating a Multicast Group

Figure 2A:
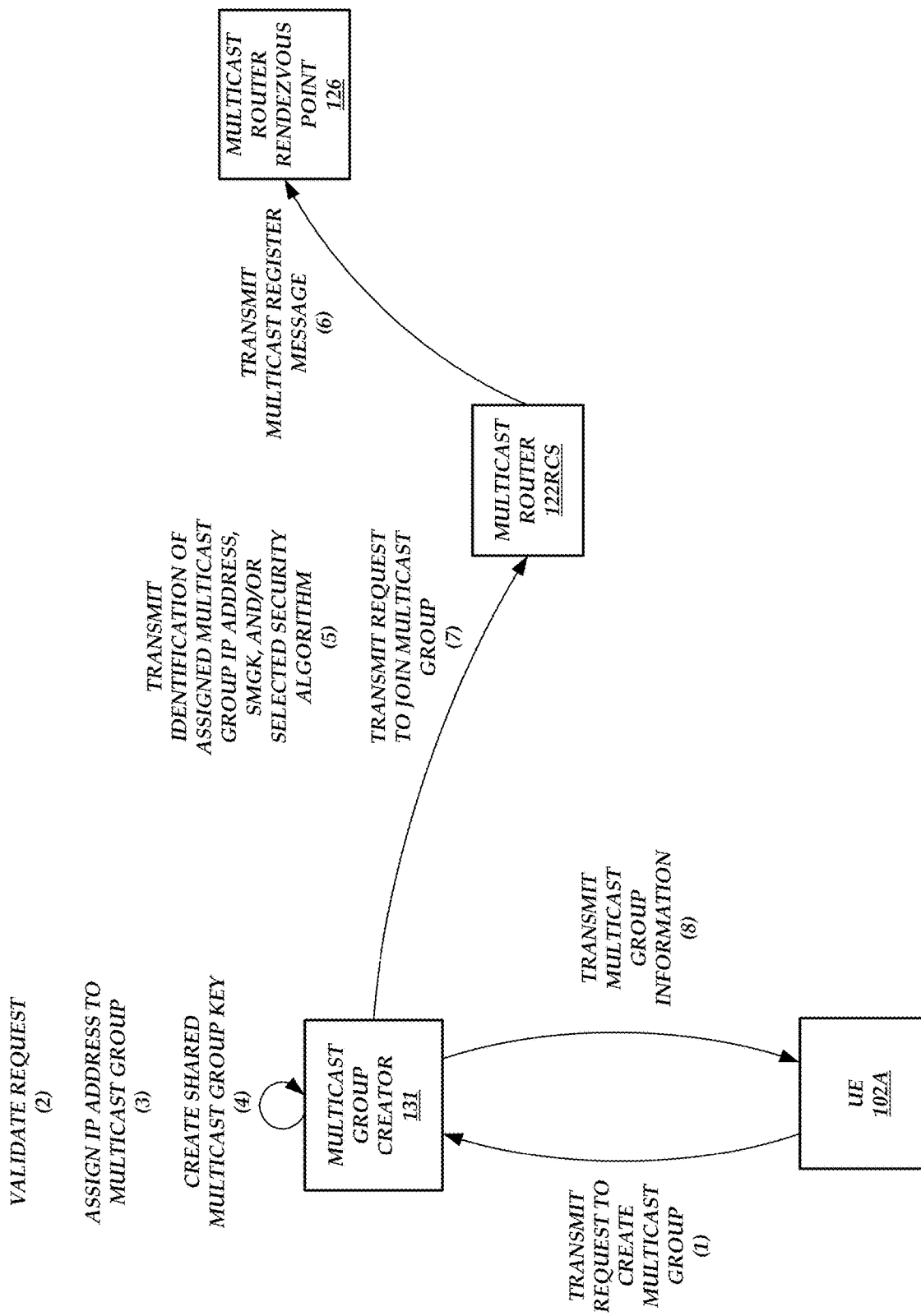
FIG. 2A is a block diagram of the secure multicast environment of FIG. 1 illustrating the operations performed by the components of the secure multicast environment of FIG. 1 to create a multicast group, according to one embodiment.

FIG. 2A is a block diagram of the secure multicast environment 100 of FIG. 1 illustrating the operations performed by the components of the secure multicast environment 100 to create a multicast group, according to one embodiment. As illustrated in FIG. 2A, a UE 102A may transmit a request to create a multicast group at (1) to the multicast group creator 131. The request may be transmitted over the control plane. As an example, the request may be a SIP invite message and indicate that UEs 102A-C are to be members of the multicast group.

In response to receiving the request, the multicast group creator 131 can validate the request at (2). For example, the multicast group creator 131 can determine whether the UEs 102 indicated in the request that are to be part of the new multicast group are registered with the telecommunications network. If the UEs 102 are validated, the multicast group creator 131 can assign an IP address to the multicast group at (3) and create a shared multicast group key (SMGK) for the multicast group at (4). For example, the multicast group creator 131 can create the SMGK by applying a function to the multicast group IP address and a random number. In addition, the multicast group creator 131 can select a security algorithm for UEs 102 to use when encrypting and/or decrypting messages. The multicast group creator 131 may then transmit an identification of the assigned multicast group IP address, the SMGK, and/or an indication of the selected security algorithm to multicast router 122RCS at (5). For example, multicast router 122RCS may be a multicast router that is local to the RCS server 130 and may be located in the core network 110.

The multicast router 122RCS may transmit a multicast register message to the multicast router rendezvous point 126 at (6). For example, the multicast register message may be a PIM register message that includes the multicast group IP address, the SMGK, and/or an indication of the selected security algorithm. Before, during, or after the multicast router 122RCS transmits the multicast register message, the multicast group creator 131 transmits to the multicast router 122RCS a request to join the multicast group at (7). For example, the request to join the multicast group may be an IGMP membership report message and include the multicast group IP address, the SMGK, and/or an indication of the selected security algorithm.

The multicast group creator 131 may transmit multicast group information to the UE 102A at (8) to complete the multicast group creation process. For example, the multicast group information transmitted to the UE 102A may include the multicast group IP address, the SMGK, and/or an indication of the selected security algorithm.

Figure 2B:
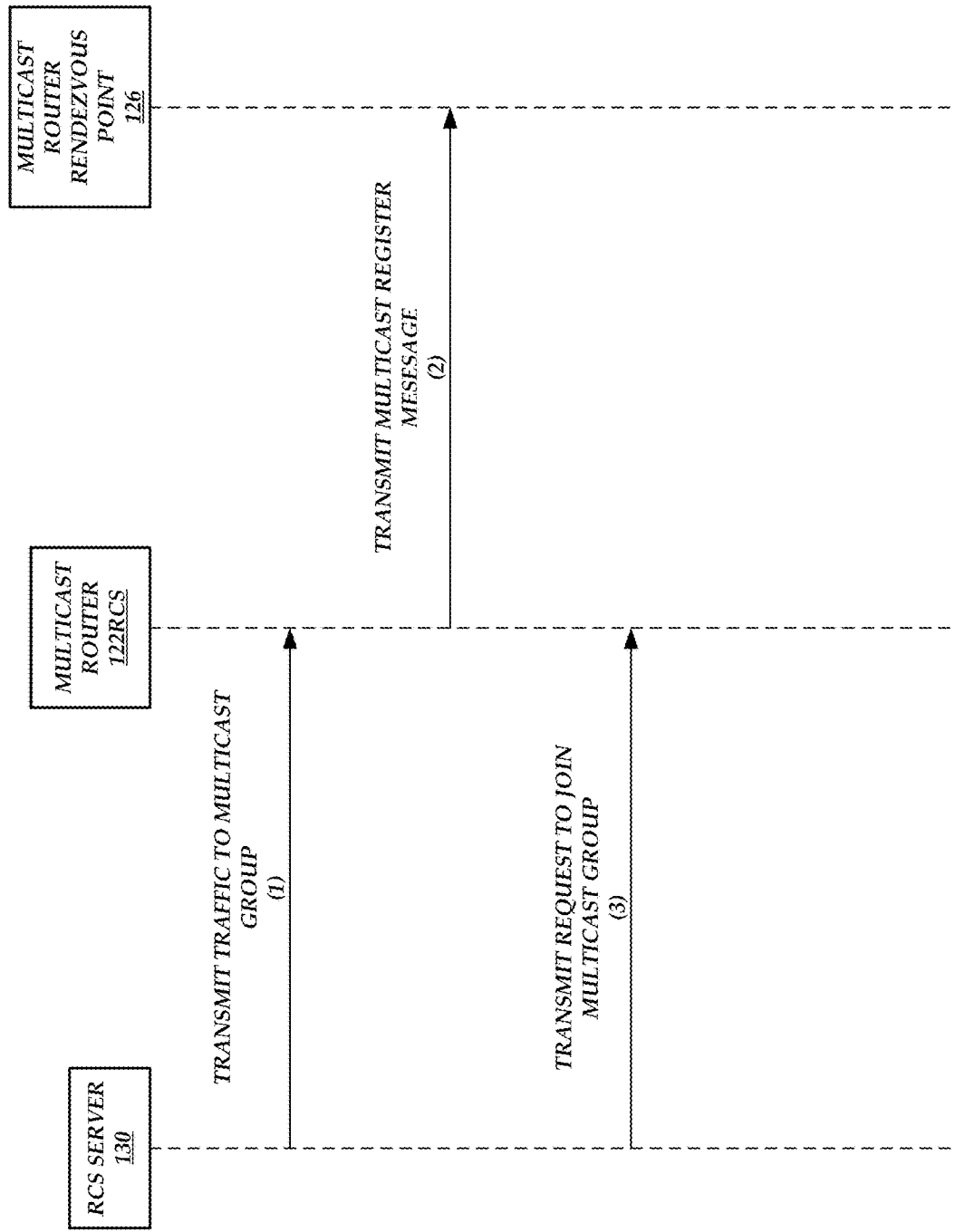
FIG. 2B is a call flow diagram corresponding to the block diagram of FIG. 2A, according to one embodiment.

FIG. 2B is a call flow diagram corresponding to the block diagram of FIG. 2A, according to one embodiment. For example, FIG. 2B illustrates the operations performed by the components of the secure multicast environment 100 to create a multicast group. As illustrated in FIG. 2B, the RCS server 130 can, in response to a request to create a multicast group, validate the request, assign an IP address to a multicast group, create an SMGK for the multicast group, select a security algorithm for UEs 102 to use when encrypting and/or decrypting messages, and/or transmit traffic to the multicast group via the multicast router 122RCS at (1) until the multicast group is created. For example, the RCS server 130 may transmit an identification of the assigned multicast group IP address, the SMGK, and/or an indication of the selected security algorithm to the multicast router 122RCS.

The multicast router 122RCS may transmit a multicast register message to the multicast router rendezvous point 126 at (2). For example, the multicast register message may be a PIM register message that includes the multicast group IP address, the SMGK, and/or an indication of the selected security algorithm. Reception of the multicast register message may cause the multicast router rendezvous point 126 to start routing multicast traffic to multicast group members and/or send a stop message (e.g., a PIM register-stop message) until a multicast group member has joined the group.

Before, during, or after the multicast router 122RCS transmits the multicast register message, the RCS server 130 transmits to the multicast router 122RCS a request to join the multicast group at (3). For example, the request to join the multicast group may be an IGMP membership report message and include the multicast group IP address, the SMGK, and/or an indication of the selected security algorithm.

Example Block Diagram for Probing Capabilities of UEs 102

Figure 3:
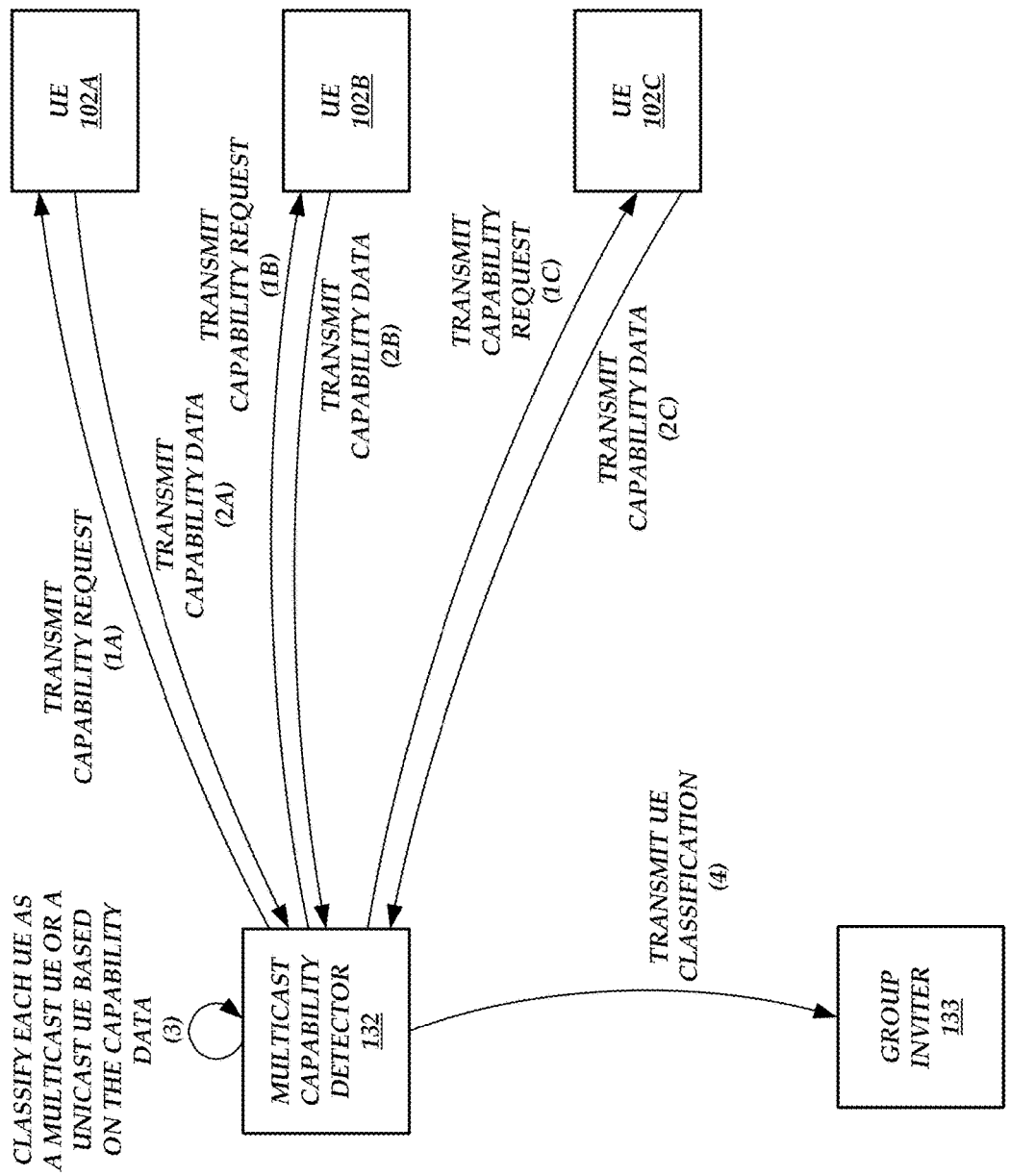
FIG. 3 is a block diagram of the secure multicast environment of FIG. 1 illustrating the operations performed by the components of the secure multicast environment of FIG. 1 to determine the capabilities of UEs and classify the UEs accordingly, according to one embodiment.

FIG. 3 is a block diagram of the secure multicast environment 100 of FIG. 1 illustrating the operations performed by the components of the secure multicast environment 100 to determine the capabilities of UEs 102A-C and classify the UEs 102A-C accordingly, according to one embodiment. As described above, the operations performed by the components of the secure multicast environment 100 to determine the capabilities of UEs 102A-C and classify the UEs 102A-C is optional. For example, the operations performed by the multicast capability detector 132 can be skipped, and the group inviter 133 can determine whether a UE 102 is a multicast UE or a unicast UE based on whether the UE 102 supports the selected security algorithm or is otherwise capable of encrypting and/or decrypting messages using the SMGK.

As illustrated in FIG. 3, the multicast capability detector 132 can transmit a capability request to the UE 102A at (1A), transmit a capability request to the UE 102B at (1B), and transmit a capability request to the UE 102C at (1C). The multicast capability detector 132 may transmit the capability requests simultaneously, nearly simultaneously (e.g., the transmission overlap in time), or in sequence. The capability request may be a SIP option message.

In response to the capability requests, the UE 102A may transmit to the multicast capability detector 132 capability data at (2A), the UE 102B may transmit to the multicast capability detector 132 capability data at (2B), and the UE 102C may transmit to the multicast capability detector 132 capability data at (2C). The UEs 102A-C may transmit the capability data simultaneously, nearly simultaneously, or in sequence. As an example, the UEs 102A-C may transmit the capability data in the form of a 200 OK message in which the contact parameter field is blank if the UE 102A-C is incapable of sending and/or receiving multicast messages and includes a contact parameter if the UE 102A-C is capable of sending and/or receiving multicast messages.

The multicast capability detector 132 can use the transmitted capability data to classify each UE 102A-C as a multicast UE or a unicast UE at (3). For example, if a UE 102A-C indicates a capability of sending and/or receiving multicast messages, then the multicast capability detector 132 classifies that UE 102A-C as a multicast UE. Likewise, if a UE 102A-C indicates the lack of a capability of sending and/or receiving multicast messages, then the multicast capability detector 132 classifies that UE 102A-C as a unicast UE. The multicast capability detector 132 can then transmit the UE 102A-C classification to the group inviter 133 at (4). Optionally, the multicast capability detector 132 can update a multicast group capabilities state table associated with the multicast group to reflect the UE 102A-C classification.

Example Block Diagram for Inviting UEs 102 to Join a Multicast Group

Figure 4A:
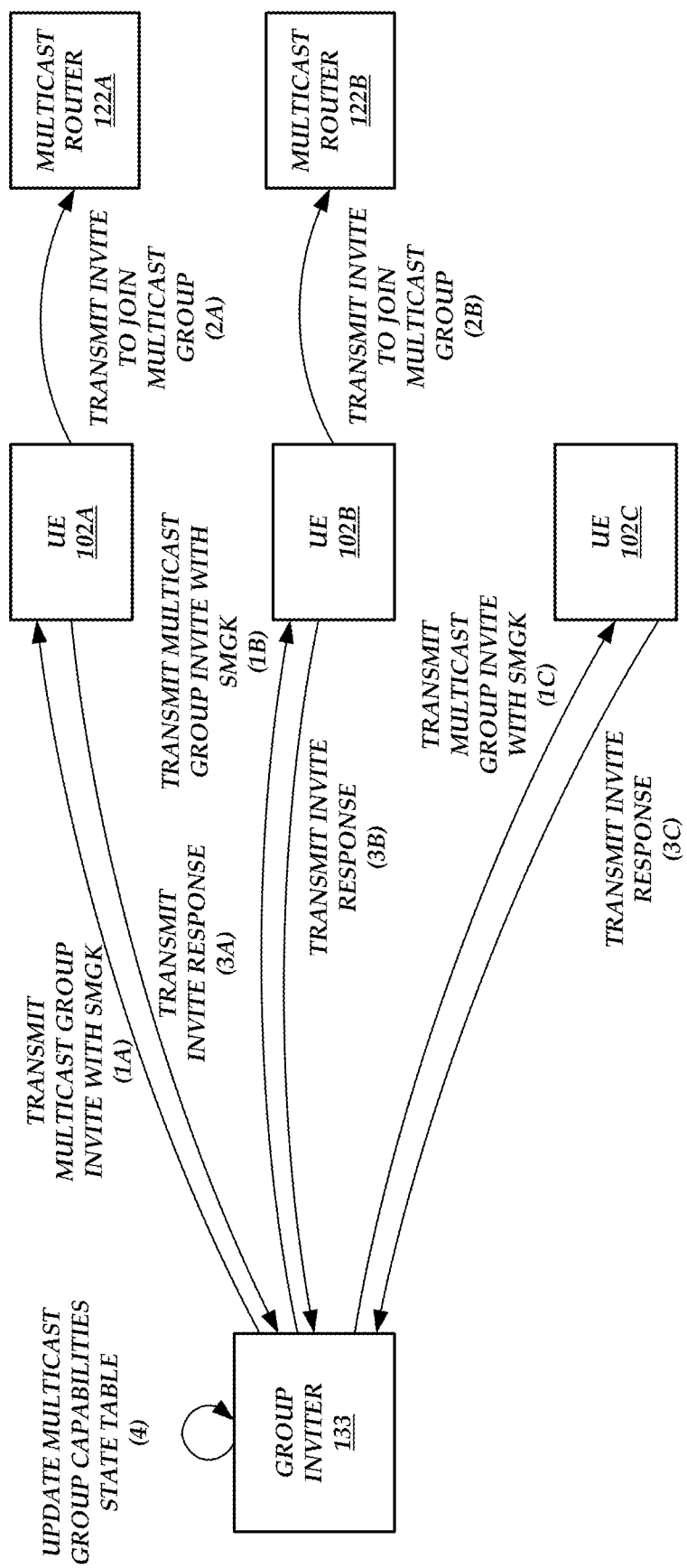
FIG. 4A is a block diagram of the secure multicast environment of FIG. 1 illustrating the operations performed by the components of the secure multicast environment of FIG. 1 to invite UEs to join the multicast group, according to one embodiment.

FIG. 4A is a block diagram of the secure multicast environment 100 of FIG. 1 illustrating the operations performed by the components of the secure multicast environment 100 to invite UEs 102A-C to join the multicast group, according to one embodiment. FIG. 4A is illustrated to depict an embodiment in which UE 102A and UE 102B are capable of sending and/or receiving multicast messages and support the selected security algorithm or are otherwise capable of encrypting and/or decrypting messages using the SMGK and in which UE 102C is incapable of sending and/or receiving multicast messages, does not support the selected security algorithm, or is otherwise incapable of encrypting and/or decrypting messages using the SMGK.

As illustrated in FIG. 4A, the group inviter 133 can transmit a multicast group invite with the SMGK to the UE 102A at (1A), transmit a multicast group invite with the SMGK to the UE 102B at (1B), and transmit a multicast group invite with the SMGK to the UE 102C at (1C). The group inviter 133 may transmit the invites in simultaneously, nearly simultaneously (e.g., the transmission overlap in time), or in sequence. The invites may be SIP invite messages and include the multicast group address, the SMGK, and/or an indication of the selected security algorithm.

In response to the invites, the UEs 102A-C each determine whether to accept the SMGK and/or the selected security algorithm. For example, the UE 102A-C can accept the SMGK and/or the selected security algorithm if the UE 102A-C supports the selected security algorithm or is otherwise capable of encrypting and/or decrypting messages using the SMGK. Here, the UE 102A and the UE 102B accepts the SMGK and/or the selected security algorithm, and the UE 102C does not accept the SMGK and/or the selected security algorithm. In response, the UE 102A transmits an invite to join the multicast group to the multicast router 122A at (2A), and the UE 102B transmits an invite to join the multicast group to the multicast router 122B at (2B). The multicast router 122A may be local to the UE 102A, and the multicast router 122B may be local to the UE 102B. The invites transmitted by the UEs 102A-B may include the multicast group IP address, the SMGK, and/or an indication of the selected security algorithm. The multicast routers 122A-B may then join the multicast group.

The UE 102A may then transmit to the group inviter 133 an invite response at (3A), the UE 102B may transmit to the group inviter 133 an invite response at (3B), and the UE 102C may transmit to the group inviter 133 an invite response at (3C). The UEs 102A-C may transmit the invite responses simultaneously, nearly simultaneously, or in sequence. The invite responses transmitted by the UEs 102A-B may include the multicast group IP address, the SMGK, and/or an indication of the selected security algorithm, whereas the invite response transmitted by the UE 102C may include the IP address of the UE 102C (such that messages sent to the multicast group IP address are also sent to the UE 102C IP address).

The group inviter 133 can then update the multicast group capabilities state table at (4) using the information provided by the invite responses. For example, the group inviter 133 can update the multicast group capabilities state table to include the multicast group IP addresses and/or UE 102C IP address included in the invite responses, and/or an indication of which UEs 102A-C accepted the SMGK and/or the selected security algorithm.

Thus, the RCS server 130 can distribute the SMGK and/or an indication of the selected security algorithm in the SIP invite messages, which may be transmitted anyways to invite UEs 102A-C to join the multicast group. The RCS server 130, therefore, reduces the number of transmissions within the multicast group by allowing UEs 102A-C to avoid having to distribute security keys to one another and by combining the invite messages and the distribution of the SMGK and/or an indication of the selected security algorithm into a single set of messages. Accordingly, the RCS server 130 can provide secure multicast communications without negatively impacting network bandwidth availability, UE 102 processing capabilities, and/or the like, thereby reducing transmission delays and improving the performance of services offered in the telecommunications network (e.g., the core network 110 and/or the access network 120).

Figure 4B:
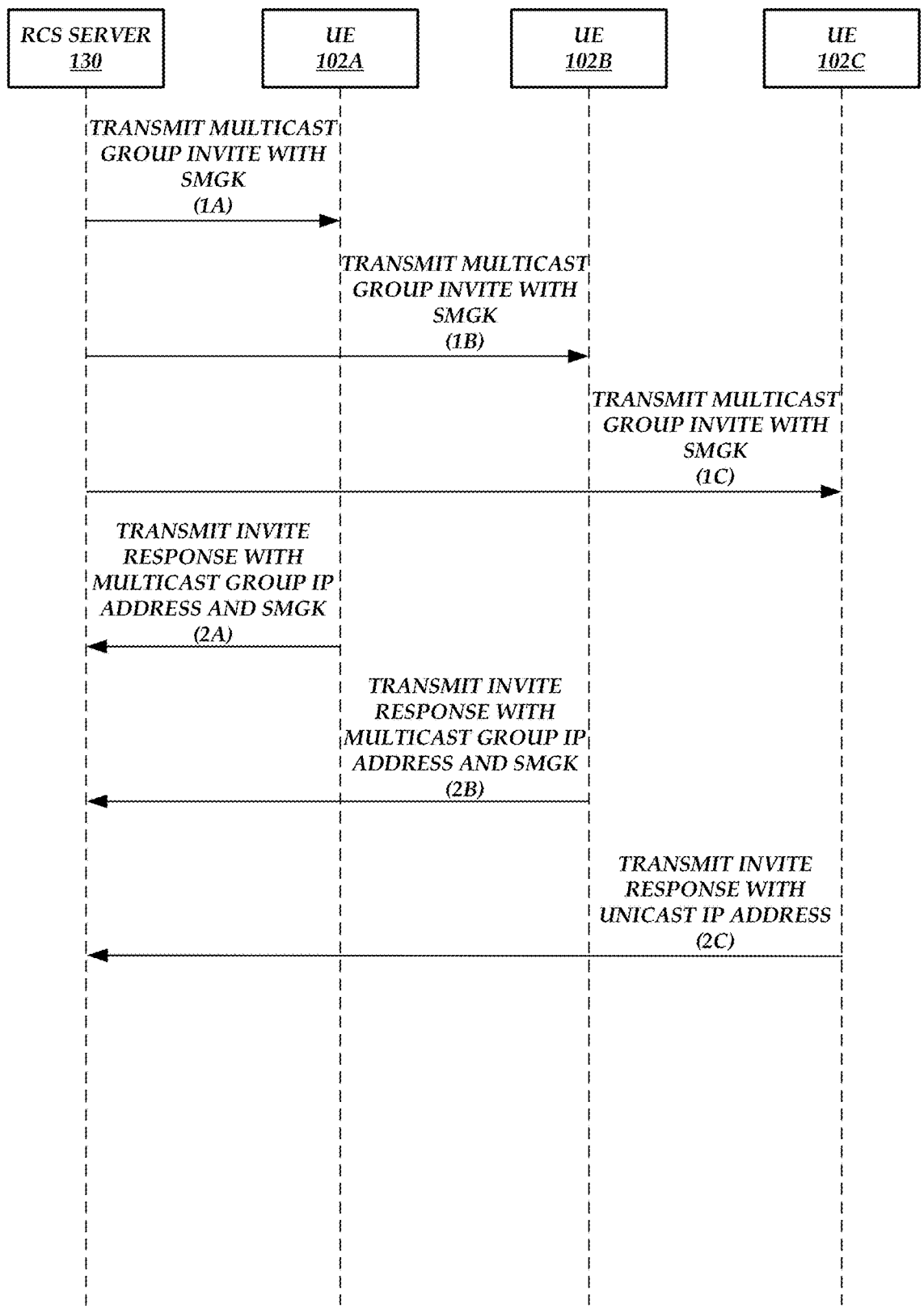
FIG. 4B is a call flow diagram corresponding to the block diagram of FIG. 4A, according to one embodiment.

FIG. 4B is a call flow diagram corresponding to the block diagram of FIG. 4A, according to one embodiment. For example, FIG. 4B illustrates the operations performed by the components of the secure multicast environment 100 to invite UEs 102A-C to join the multicast group. As illustrated in FIG. 4B, the RCS server 130 can transmit a multicast group invite with the SMGK to the UE 102A at (1A), transmit a multicast group invite with the SMGK to the UE 102B at (1B), and transmit a multicast group invite with the SMGK to the UE 102C at (1C). The group inviter 133 may transmit the invites in simultaneously, nearly simultaneously (e.g., the transmission overlap in time), or in sequence. The invites may be SIP invite messages and include the multicast group address (e.g., in the destination field), the RCS server 130 address (e.g., in the source field), the SMGK, and/or an indication of the selected security algorithm.

In response to the invites, the UEs 102A-C each determine whether to accept the SMGK and/or the selected security algorithm. Here, the UE 102A and the UE 102B accepts the SMGK and/or the selected security algorithm, and the UE 102C does not accept the SMGK and/or the selected security algorithm. Accordingly, the UE 102A may then transmit to the RCS server 130 an invite response with the multicast group IP address and the SMGK at (2A), the UE 102B may transmit to the RCS server 130 an invite response with the multicast group IP address and the SMGK at (2B), and the UE 102C may transmit to the RCS server 130 an invite response with the unicast IP address of the UE 102C at (2C).

Example Block Diagrams for Routing a Message Originating from a Multicast UE

Figure 5A:
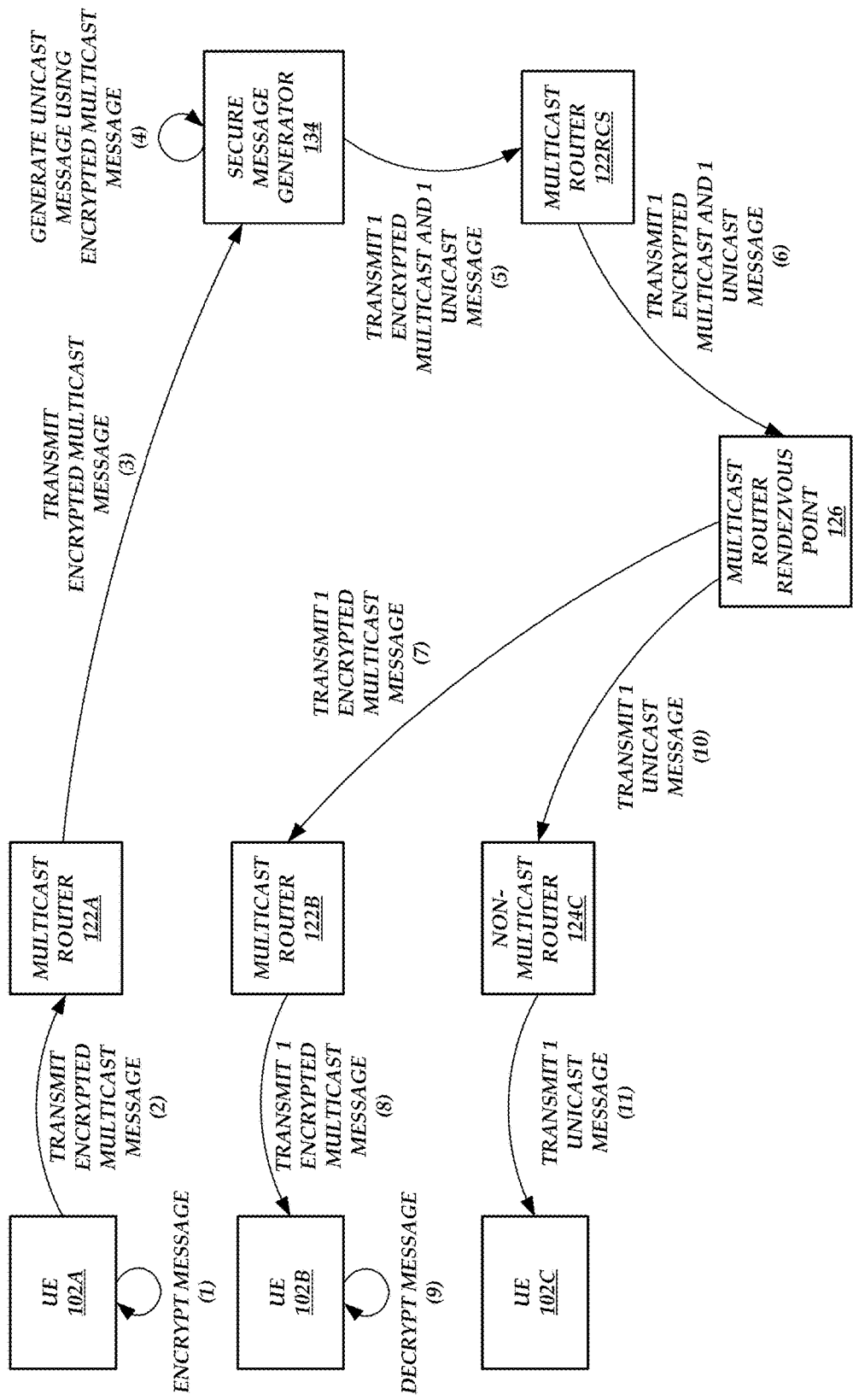
FIGS. 5A-5B are block diagrams of the secure multicast environment of FIG. 1 illustrating the operations performed by the components of the secure multicast environment of FIG. 1 to route a message originating from a multicast UE, according to one embodiment.
Figure 5B:
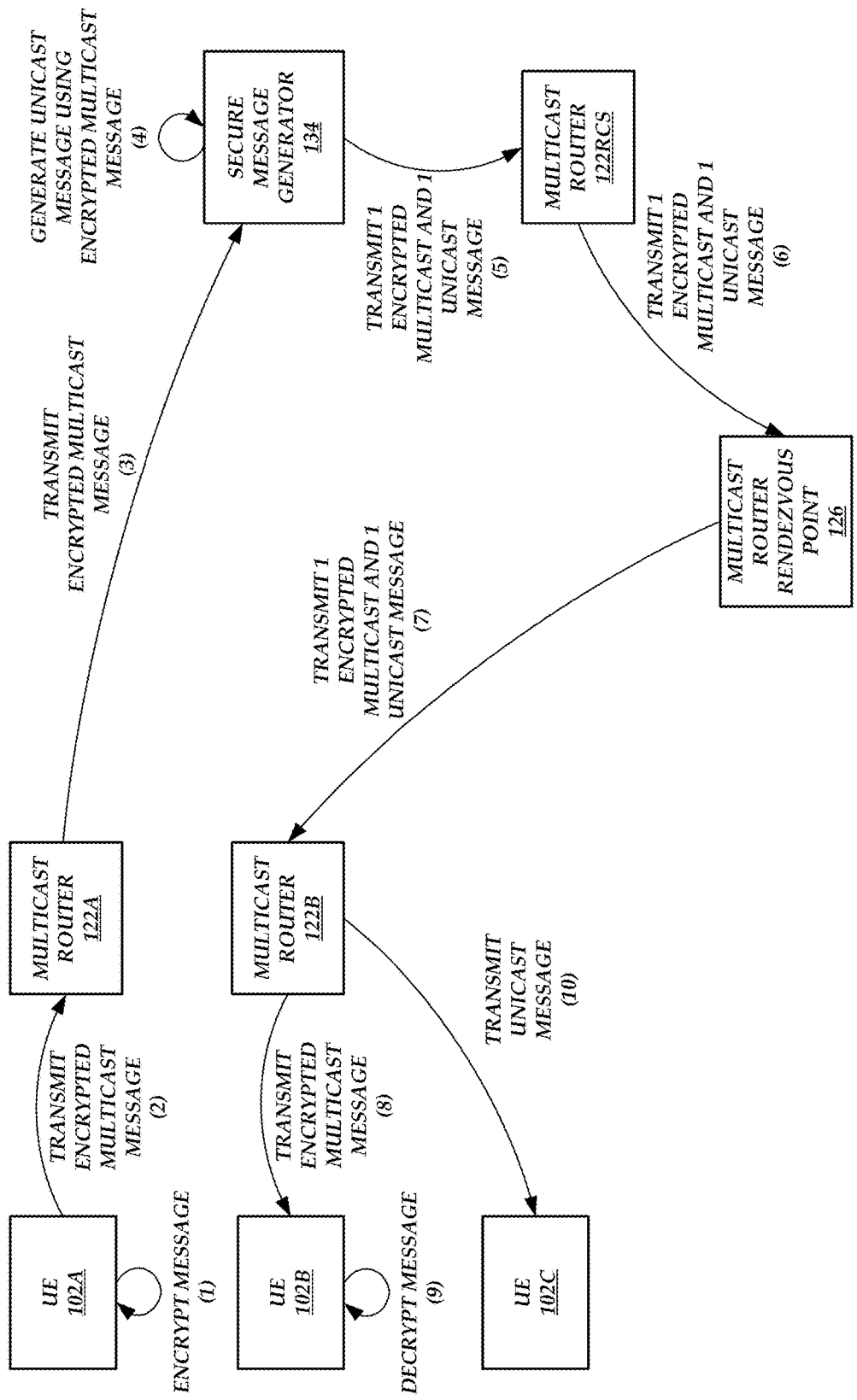

FIGS. 5A-5B are block diagrams of the secure multicast environment 100 of FIG. 1 illustrating the operations performed by the components of the secure multicast environment 100 to route a message originating from a multicast UE 102A, according to one embodiment. FIG. 5A is illustrated to depict an embodiment in which UE 102B and UE 102C do not share the same local router. Rather, multicast router 122B is local to UE 102B and non-multicast router 124C is local to UE 102C. As illustrated in FIG. 5A, the UE 102A encrypts a message (e.g., using the SMGK and/or the selected security algorithm) at (1) and transmits an encrypted multicast message to the multicast router 122A at (2). The multicast router 122A may be local to the UE 102A. The multicast router 122A may then forward the encrypted multicast message to the secure message generator 134 at (3) via one or more routers in the access network 120 and/or the core network 110 and via the multicast router rendezvous point 126, where such intermediary transmissions are not shown for simplicity.

The secure message generator 134 may receive the encrypted multicast message transmitted by the UE 102A (e.g., via the multicast router rendezvous point 126) and generate a unicast message using the encrypted multicast message at (4). For example, the encrypted multicast message transmitted by the UE 102A may include the multicast group IP address for the multicast group created with respect to FIG. 2A (e.g., in the destination field). The secure message generator 134 may use this multicast group IP address (or any other identifier of a corresponding multicast group) to retrieve and query the multicast group capabilities state table for the multicast group corresponding to the multicast group IP address to determine whether any UEs 102 that are members of the multicast group are unicast UEs. Here, the UE 102C is a unicast UE that is a member of the multicast group. Thus, the secure message generator 134 decrypts the encrypted multicast message using the SMGK and/or the selected security algorithm, and replicates the decrypted multicast message once to form the unicast message. If other UEs 102 that are members of the multicast group are also unicast UEs, then the secure message generator 134 may repeat the replication a number of times equaling the number of UEs 102 that are members of the multicast group and that are unicast UEs.

The secure message generator 134 then transmits 1 encrypted multicast message and 1 unicast message to the multicast router 122RCS at (5). The secure message generator 134 would transmit 1 encrypted multicast message even if there is more than one multicast UE (not including the source UE 102A) that is a member of the multicast group. The multicast router 122RCS then transmits the 1 encrypted multicast message and the 1 unicast message to the multicast router rendezvous point 126 at (6). Alternatively, the secure message generator 134 can transmit the 1 encrypted multicast message and the 1 unicast message directly to the multicast router rendezvous point 126.

The multicast router rendezvous point 126 can then transmit the 1 encrypted multicast message to the multicast router 122B at (7), optionally via one or more routers present in the access network 120 and/or the core network 110. The multicast router 122B then transmits the 1 encrypted multicast message to the UE 102B at (8). The UE 102B can then decrypt the encrypted multicast message at (9) using the SMGK and/or the selected security algorithm to decrypt the encrypted multicast message. For example, the UE 102B can apply the selected security algorithm to the encrypted multicast message using the SMGK.

Before, during, or after transmitting the 1 encrypted multicast message to the multicast router 122B, the multicast router rendezvous point 126 transmits the 1 unicast message to the non-multicast router 124C at (10), optionally via one or more routers present in the access network 120 and/or the core network 110. The non-multicast router 124C then transmits the 1 unicast message to the UE 102C at (11).

In some embodiments, not shown, the multicast router rendezvous point 126 also transmits the 1 encrypted multicast message to the multicast router 122A, optionally via one or more routers present in the access network 120 and/or the core network 110, so that the multicast router 122A can forward the encrypted multicast message to the UE 102A (even though the UE 102A is the source of the communication).

FIG. 5B is illustrated to depict an embodiment in which UE 102B and UE 102C do share the same local router. For example, multicast router 122B may be local to UE 102B and UE 102C. Here, UE 102C may be classified as a unicast UE because the UE 102C is not capable of handling multicast messages, does not support the selected security algorithm, and/or otherwise is incapable of encrypting and/or decrypting messages using the SMGK. UE 102C may have been classified as a multicast UE if the UE 102C could handle multicast messages and/or if the UE 102C supported the selected security algorithm or otherwise was capable of encrypting and/or decrypting messages using the SMGK given that the router local to the UE 102 is capable of handling multicast messages. As illustrated in FIG. 5B, the UE 102A encrypts a message (e.g., using the SMGK and/or the selected security algorithm) at (1) and transmits an encrypted multicast message to the multicast router 122A at (2). The multicast router 122A may be local to the UE 102A. The multicast router 122A may then forward the encrypted multicast message to the secure message generator 134 at (3) via one or more routers in the access network 120 and/or the core network 110 and via the multicast router rendezvous point 126, where such intermediary transmissions are not shown for simplicity.

The secure message generator 134 may receive the encrypted multicast message transmitted by the UE 102A (e.g., via the multicast router rendezvous point 126) and generate a unicast message using the encrypted multicast message at (4). For example, the encrypted multicast message transmitted by the UE 102A may include the multicast group IP address for the multicast group created with respect to FIG. 2A (e.g., in the destination field). The secure message generator 134 may use this multicast group IP address (or any other identifier of a corresponding multicast group) to retrieve and query the multicast group capabilities state table for the multicast group corresponding to the multicast group IP address to determine whether any UEs 102 that are members of the multicast group are unicast UEs. Here, the UE 102C is a unicast UE that is a member of the multicast group. Thus, the secure message generator 134 decrypts the encrypted multicast message using the SMGK and/or the selected security algorithm, and replicates the decrypted multicast message once to form the unicast message. If other UEs 102 that are members of the multicast group are also unicast UEs, then the secure message generator 134 may repeat the replication a number of times equaling the number of UEs 102 that are members of the multicast group and that are unicast UEs.

The secure message generator 134 then transmits 1 encrypted multicast message and 1 unicast message to the multicast router 122RCS at (5). The secure message generator 134 would transmit 1 encrypted multicast message even if there is more than one multicast UE (not including the source UE 102A) that is a member of the multicast group. The multicast router 122RCS then transmits the 1 encrypted multicast message and the 1 unicast message to the multicast router rendezvous point 126 at (6). Alternatively, the secure message generator 134 can transmit the 1 encrypted multicast message and the 1 unicast message directly to the multicast router rendezvous point 126.

The multicast router rendezvous point 126 can then transmit the 1 encrypted multicast message and the 1 unicast message to the multicast router 122B at (7), optionally via one or more routers present in the access network 120 and/or the core network 110. The multicast router 122B then transmits the 1 encrypted multicast message to the UE 102B at (8). The UE 102B can then decrypt the encrypted multicast message at (9) using the SMGK and/or the selected security algorithm. For example, the UE 102B can apply the selected security algorithm to the encrypted multicast message using the SMGK to decrypt the encrypted multicast message. Before, during, or after transmitting the 1 encrypted multicast message to the UE 102B, the multicast router 122B transmits the 1 unicast message to the UE 102C at (10).

In some embodiments, not shown, the multicast router rendezvous point 126 also transmits the 1 encrypted multicast message to the multicast router 122A, optionally via one or more routers present in the access network 120 and/or the core network 110, so that the multicast router 122A can forward the multicast message to the UE 102A (even though the UE 102A is the source of the communication).

Example Block Diagrams for Routing a Message Originating from a Unicast UE

Figure 6A:
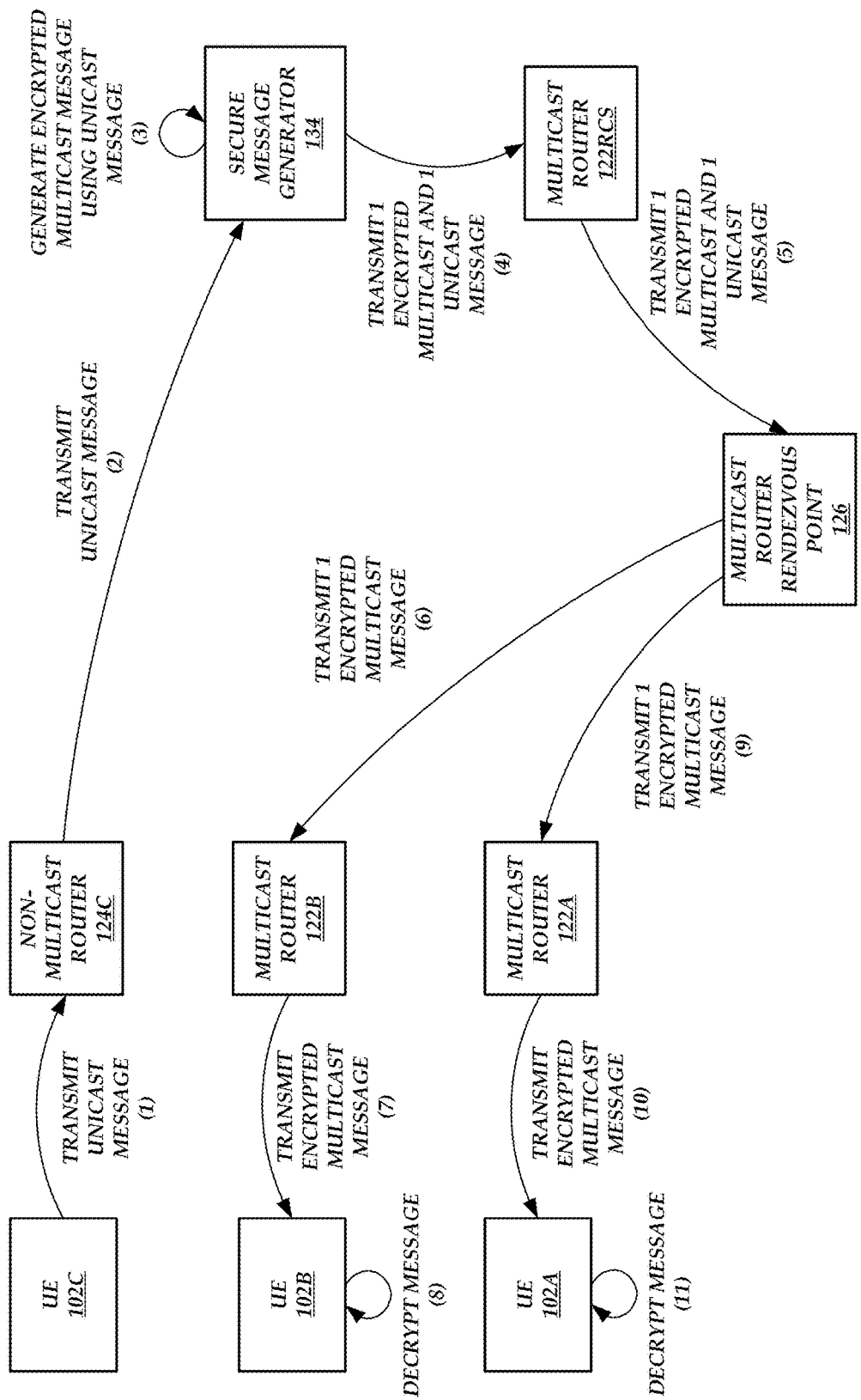
FIGS. 6A-6B are block diagrams of the secure multicast environment of FIG. 1 illustrating the operations performed by the components of the secure multicast environment of FIG. 1 to route a message originating from a unicast UE, according to one embodiment.
Figure 6B:
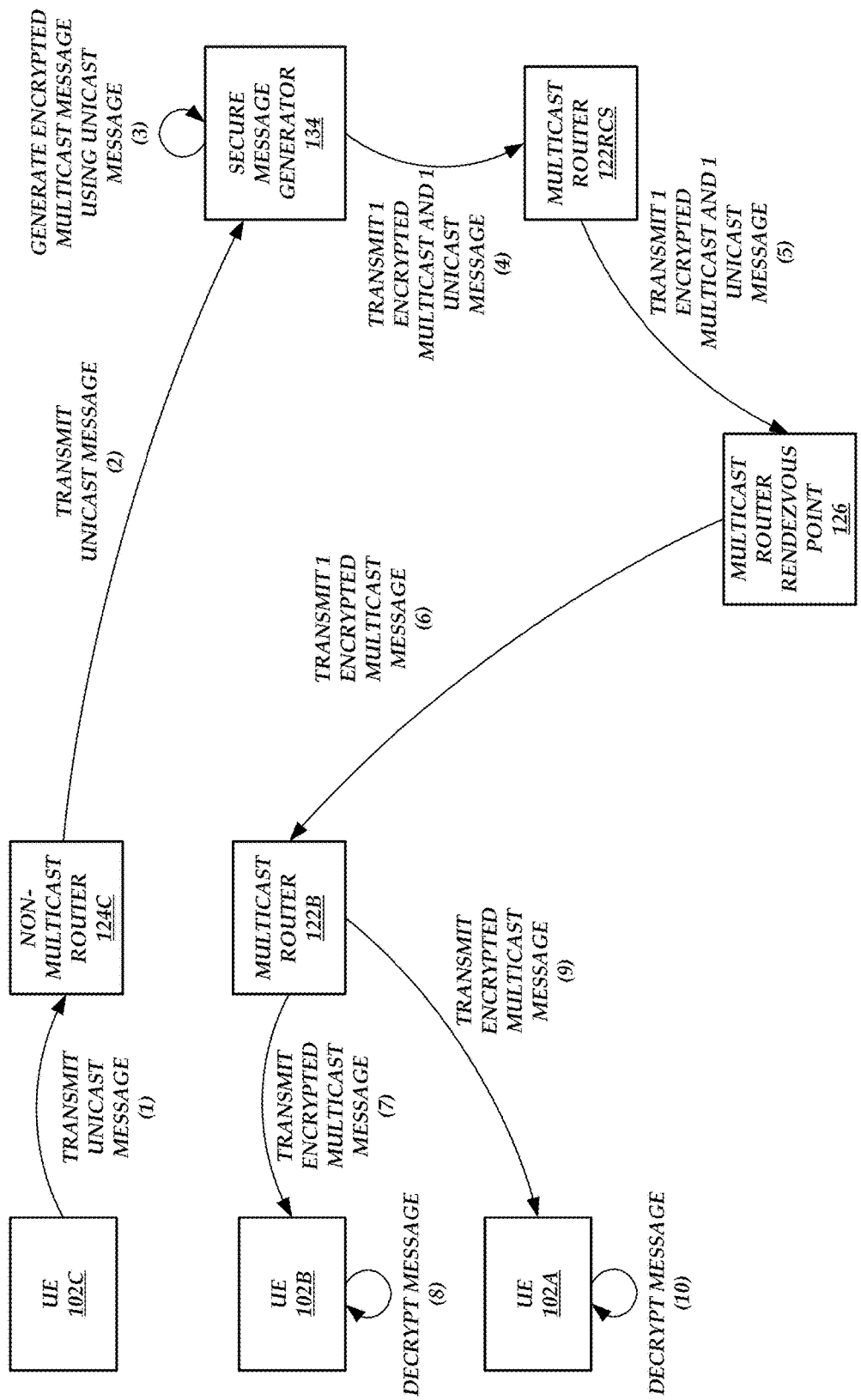

FIGS. 6A-6B are block diagrams of the secure multicast environment 100 of FIG. 1 illustrating the operations performed by the components of the multicast environment 100 to route a message originating from a unicast UE 102C, according to one embodiment. FIG. 6A is illustrated to depict an embodiment in which UE 102A and UE 102B do not share the same local router. Rather, multicast router 122A is local to UE 102A and multicast router 122B is local to UE 102B. As illustrated in FIG. 6A, the UE 102C transmits a unicast message to the non-multicast router 124C at (1). The non-multicast router 124C may be local to the UE 102C. The non-multicast router 124C may then forward the unicast message to the secure message generator 134 at (2) via one or more routers in the access network 120 and/or the core network 110 and via the multicast router rendezvous point 126, where such intermediary transmissions are not shown for simplicity.

The secure message generator 134 may receive the unicast message transmitted by the UE 102C (e.g., via the multicast router rendezvous point 126) and generate an encrypted multicast message using the unicast message at (3). For example, the unicast message may identify a multicast group (e.g., the multicast group IP address), and the secure message generator 134 may use this information to retrieve and query the multicast group capabilities state table for the corresponding multicast group to determine whether any UEs 102 that are members of the multicast group are unicast UEs. Here, the UE 102C is a unicast UE that is a member of the multicast group. However, the secure message generator 134 may not replicate the unicast message because only one UE 102A-C in the multicast group is a unicast UE. The secure message generator 134 can then optionally modify fields of the unicast message (e.g., to change a source address), and apply the selected security algorithm to the optionally modified unicast message using the SMGK to generate the encrypted multicast message.

The secure message generator 134 then transmits 1 encrypted multicast message and 1 unicast message to the multicast router 122RCS at (4). The secure message generator 134 transmits 1 encrypted multicast message even though two UEs, UE 102A and 102B, are multicast UEs that are intended recipients of the message transmitted by the UE 102C. The multicast router 122RCS then transmits the 1 encrypted multicast message and the 1 unicast message to the multicast router rendezvous point 126 at (5). Alternatively, the secure message generator 134 can transmit the 1 encrypted multicast message and the 1 unicast message directly to the multicast router rendezvous point 126.

The multicast router rendezvous point 126 can then transmit the 1 encrypted multicast message to the multicast router 122B at (6), optionally via one or more routers present in the access network 120 and/or the core network 110. The multicast router 122B then transmits the 1 encrypted multicast message to the UE 102B at (7). The UE 102B can then decrypt the encrypted multicast message at (8) using the SMGK and/or the selected security algorithm to decrypt the encrypted multicast message. For example, the UE 102B can apply the selected security algorithm to the encrypted multicast message using the SMGK.

Before, during, or after transmitting the 1 encrypted multicast message to the multicast router 122B, the multicast router rendezvous point 126 also transmits the 1 encrypted multicast message to the multicast router 122A at (9), optionally via one or more routers present in the access network 120 and/or the core network 110. The multicast router 122A then transmits the 1 encrypted multicast message to the UE 102A at (10). The UE 102A can then decrypt the encrypted multicast message at (11) using the SMGK and/or the selected security algorithm to decrypt the encrypted multicast message. For example, the UE 102A can apply the selected security algorithm to the encrypted multicast message using the SMGK.

In some embodiments, not shown, the multicast router rendezvous point 126 also transmits the 1 unicast message to the non-multicast router 124C, optionally via one or more routers present in the access network 120 and/or the core network 110, so that the non-multicast router 124C can forward the unicast message to the UE 102C (even though the UE 102C is the source of the communication).

FIG. 6B is illustrated to depict an embodiment in which UE 102A and UE 102B do share the same local router. For example, multicast router 122B may be local to UE 102A and UE 102B. As illustrated in FIG. 6B, the UE 102C transmits a unicast message to the non-multicast router 124C at (1). The non-multicast router 124C may be local to the UE 102C. The non-multicast router 124C may then forward the unicast message to the secure message generator 134 at (2) via one or more routers in the access network 120 and/or the core network 110 and via the multicast router rendezvous point 126, where such intermediary transmissions are not shown for simplicity.

The secure message generator 134 may receive the unicast message transmitted by the UE 102C (e.g., via the multicast router rendezvous point 126) and generate an encrypted multicast message using the unicast message at (3). For example, the unicast message may identify a multicast group (e.g., the multicast group IP address), and the secure message generator 134 may use this information to retrieve and query the multicast group capabilities state table for the corresponding multicast group to determine whether any UEs 102 that are members of the multicast group are unicast UEs. Here, the UE 102C is a unicast UE that is a member of the multicast group. However, the secure message generator 134 may not replicate the unicast message because only one UE 102A-C in the multicast group is a unicast UE. The secure message generator 134 can then optionally modify fields of the unicast message (e.g., to change a source address), and apply the selected security algorithm to the optionally modified unicast message using the SMGK to generate the encrypted multicast message.

The secure message generator 134 then transmits 1 encrypted multicast message and 1 unicast message to the multicast router 122RCS at (4). The secure message generator 134 transmits 1 encrypted multicast message even though two UEs, UE 102A and 102B, are multicast UEs that are intended recipients of the message transmitted by the UE 102C. The multicast router 122RCS then transmits the 1 encrypted multicast message and the 1 unicast message to the multicast router rendezvous point 126 at (5). Alternatively, the secure message generator 134 can transmit the 1 encrypted multicast message and the 1 unicast message directly to the multicast router rendezvous point 126.

The multicast router rendezvous point 126 can then transmit the 1 encrypted multicast message to the multicast router 122B at (6), optionally via one or more routers present in the access network 120 and/or the core network 110. The multicast router 122B then transmits the 1 encrypted multicast message to the UE 102B at (7). The UE 102B can then decrypt the encrypted multicast message at (8) using the SMGK and/or the selected security algorithm to decrypt the encrypted multicast message. For example, the UE 102B can apply the selected security algorithm to the encrypted multicast message using the SMGK.

Before, during, or after transmitting the 1 encrypted multicast message to the multicast router UE 102B, the multicast router 122B transmits the 1 encrypted multicast message to the UE 102A at (9). The UE 102A can then decrypt the encrypted multicast message at (10) using the SMGK and/or the selected security algorithm to decrypt the encrypted multicast message. For example, the UE 102A can apply the selected security algorithm to the encrypted multicast message using the SMGK.

Thus, the secure message generator 134 transmits 1 encrypted multicast message even though two multicast UEs are the intended recipients of the message. This is unlike systems that rely on unicast messages, in which the secure message generator 134 would have to transmit two independent unicast messages (one intended for UE 102A and one intended for UE 102B) to complete the message transmission process. Thus, the techniques implemented by the RCS server 130 can reduce the telecommunications network load, resulting in improved service performance, regardless of the number of UEs that are members of a group.

In some embodiments, not shown, the multicast router rendezvous point 126 also transmits the 1 unicast message to the non-multicast router 124C, optionally via one or more routers present in the access network 120 and/or the core network 110, so that the non-multicast router 124C can forward the unicast message to the UE 102C (even though the UE 102C is the source of the communication).

Example Multicast Group Capabilities State Table

FIG. 7 illustrates an example multicast group capabilities state table 700, according to one embodiment. The table 700 may be created and/or updated by the multicast capabilities detector 132, the group inviter 133, and/or the secure message generator 134 as described herein. The table 700 may correspond to a specific multicast group.

As illustrated in FIG. 7, the table 700 depicts the IDs of UEs that are members of a particular multicast group. For example, the table depicts the IDs of UEs 102A-C. The table 700 further depicts the multicast group IP address for the UEs (e.g., UEs 102A-B) that are multicast UEs. The table 700 further depicts the unicast IP address for the UEs (e.g. UE 102C) that are unicast UEs. The table 700 further depicts whether a corresponding UE is a secured multicast group member (e.g., capable of encrypting and/or decrypting messages using the selected security algorithm and/or the SMGK). The table 700 further depicts an indication of the selected security algorithm (e.g., Algorithm #1, as illustrated in FIG. 7) used by the corresponding UE to encrypt and/or decrypt messages, if applicable. The table 700 further depicts an indication of the SMGK (e.g., Key #1, as illustrated in FIG. 7) used by the corresponding UE to encrypt and/or decrypt messages, if applicable. As described herein, the table 700 may be updated if the capabilities of the UEs 102A-C and/or the routers local to the UEs 102A-C change.

Example Secured Multicast Group Creation Routine

Figure 8:
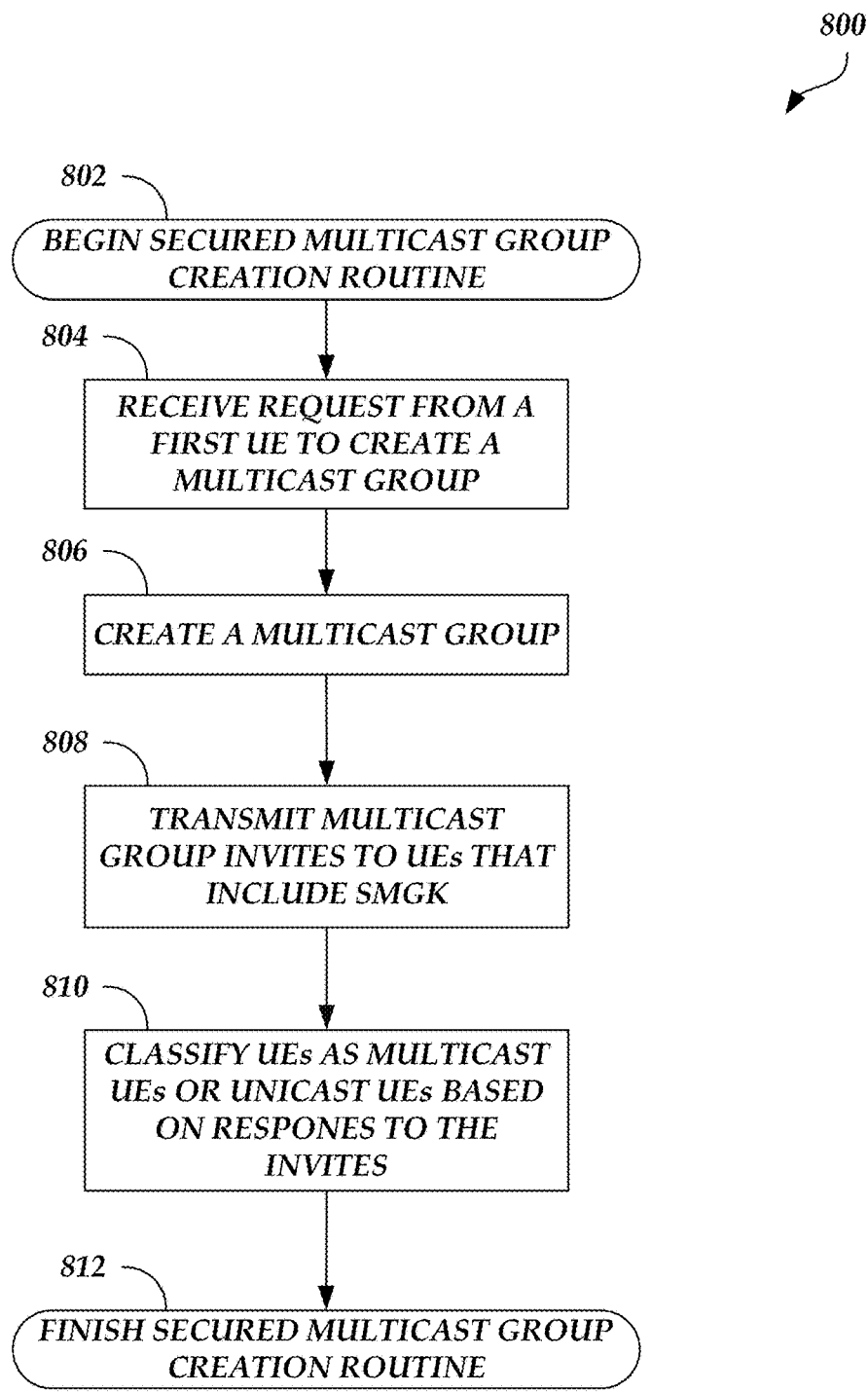
FIG. 8 is a flow diagram depicting a secure multicast group creation routine illustratively implemented by a RCS server, according to one embodiment.

FIG. 8 is a flow diagram depicting a secured multicast group creation routine 800 illustratively implemented by a RCS server, according to one embodiment. As an example, the RCS server 130 of FIG. 1 can be configured to execute the secured multicast group creation routine 800. The secured multicast group creation routine 800 begins at block 802.

At block 804, a request from a first UE is received to create a multicast group. The request may be received when the first UE intends to send a message to a group of UEs. The request may include a list of UEs that are to be members of the group.

At block 806, a multicast group is created. For example, a multicast group address may be assigned to a new multicast group. The multicast group address may be assigned once the UEs designated as being members of the group are validated as being registered with the telecommunications network. A SMGK may also be assigned to the new multicast group, and a security algorithm may be selected for the multicast group.

At block 808, multicast group invites that include the SMGK assigned to the multicast group are transmitted to the UEs. In addition, the selected security algorithm may be included in the multicast group invites as well. The UEs may respond with acknowledgments indicating whether the SMGK and/or the selected security algorithm are accepted or rejected.

At block 810, UEs are classified as multicast UEs or unicast UEs based on the responses to the invites. For example, UEs that accept the SMGK and/or the selected security algorithm (e.g., by returning the SMGK and/or the selected security algorithm in the SDP field of the acknowledgment) are classified as multicast UEs (and will receive encrypted multicast messages), and UEs that decline the SMGK and/or the selected security algorithm (e.g., by returning the UE's unicast address instead of the SMGK and/or the selected security algorithm in the SDP field of the acknowledgment) are classified as unicast UEs (and will receive unicast messages). Once the UEs are classified, the secured multicast ddgroup creation routine 800 may be complete, as shown at block 812.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer implemented method comprising:
   assigning a security key to a multicast group;
   transmitting a first multicast invite message to a first user equipment (UE) to join the multicast group and a second multicast invite message to a second UE to join the multicast group, wherein the first and second multicast invite messages comprise the security key;
   receiving a response from the first UE indicating that the first multicast invite message is accepted; and
   receiving a second response from the second UE indicating that the second multicast invite message is not accepted, wherein a message intended for the multicast group is transmitted as a secure multicast message to the first UE and as a unicast message to the second UE,
   wherein the computer-implemented method is implemented by a computing system comprising physical hardware and operating in a core network of the telecommunications network.

2. The computer-implemented method of claim 1, wherein assigning a security key to a multicast group further comprises:
   assigning an address to the multicast group;
   generating a random number; and
   applying a function to the address and to the random number to create the security key.

3. The computer-implemented method of claim 2, wherein the function comprises one of a concatenation, a multiplication, a modulo, or a hash function.

4. The computer-implemented method of claim 1, wherein the first UE is configured to decrypt the secure multicast message using the security key and a security algorithm.

5. The computer-implemented method of claim 1, further comprising:
   obtaining information subsequent to transmission of the unicast message indicating that the second UE supports multicast messaging; and
   transmitting a third multicast invite message to the second UE, wherein a second message intended for the multicast group is transmitted as a secure second multicast message to the second UE instead of as a second unicast message.

6. The computer-implemented method of claim 1, further comprising:
receiving a second message transmitted by the second UE;
generating a second secure multicast message using the second message transmitted by the second UE and the security key; and
transmitting a single copy of the second secure multicast message for reception by a first multicast router local to the first UE and the second UE, wherein reception of the second secure multicast message causes the first multicast router to transmit the second secure multicast message to the first UE.

7. Non-transitory, computer-readable storage media comprising computer-executable instructions, wherein the computer-executable instructions, when executed by a computing system that operates in a core network of a telecommunications network, cause the computing system to:
assign a security key to a multicast group;
transmit a first multicast invite message to a first user equipment (UE) to join the multicast group and a second multicast invite message to a second UE to join the multicast group, wherein the first and second multicast invite messages comprise the security key;
process a response received from the first UE indicating that the first multicast invite message is accepted; and
process a second response received from the second UE indicating that the second multicast invite message is not accepted, wherein a message intended for the multicast group is transmitted as a secure multicast message to the first UE and as a unicast message to the second UE.

8. The non-transitory, computer-readable storage media of claim 7, wherein the computer-executable instructions further cause the computing system to:
assign an address to the multicast group;
generate a random number; and
apply a function to the address and to the random number to create the security key.

9. The non-transitory, computer-readable storage media of claim 8, wherein the function comprises one of a concatenation, a multiplication, a modulo, or a hash function.

10. The non-transitory, computer-readable storage media of claim 7, wherein the first UE is configured to decrypt the secure multicast message using the security key and a security algorithm.

11. The non-transitory, computer-readable storage media of claim 7, wherein the computer-executable instructions further cause the computing system to:
obtain information subsequent to transmission of the unicast message indicating that the second UE supports multicast messaging; and
transmit a third multicast invite message to the second UE, wherein a second message intended for the multicast group is transmitted as a secure second multicast message to the second UE instead of as a second unicast message.

12. The non-transitory, computer-readable storage media of claim 7, wherein a first multicast router is local to the first UE and the second UE.

13. The non-transitory, computer-readable storage media of claim 12, wherein the computer-executable instructions further cause the computing system to:
process a second message transmitted by the second UE;
generate a second secure multicast message using the second message transmitted by the second UE and the security key; and
transmit a single copy of the second secure multicast message for reception by the first multicast router, wherein reception of the second secure multicast message causes the first multicast router to transmit the second secure multicast message to the first UE.

14. A core network comprising:
a multicast router rendezvous point; and
a computing system comprising a hardware processor in communication with the multicast router rendezvous point and configured with specific computer-executable instructions to:
assign a security key to a multicast group;
transmit a first multicast invite message to a first user equipment (UE) to join the multicast group and a second multicast invite message to a second UE to join the multicast group, wherein the first and second multicast invite messages comprise the security key;
process a response received from the first UE indicating that the first multicast invite message is accepted; and
process a second response received from the second UE indicating that the second multicast invite message is not accepted, wherein a message intended for the multicast group is transmitted as a secure multicast message to the first UE and as a unicast message to the second UE.

15. The core network of claim 14, wherein the computing system is further configured with specific computer-executable instructions to:
assign an address to the multicast group;
generate a random number; and
apply a function to the address and to the random number to create the security key.

16. The core network of claim 15, wherein the function comprises one of a concatenation, a multiplication, a modulo, or a hash function.

17. The core network of claim 14, wherein the first UE is configured to decrypt the secure multicast message using the security key and a security algorithm.

18. The core network of claim 14, wherein the computing system is further configured with specific computer-executable instructions to:
obtain information subsequent to transmission of the unicast message indicating that the second UE supports multicast messaging; and
transmit a third multicast invite message to the second UE, wherein a second message intended for the multicast group is transmitted as a secure second multicast message to the second UE instead of as a second unicast message.

19. The core network of claim 14, further comprising a first multicast router local to the first UE and the second UE.

20. The core network of claim 19, wherein the computing system is further configured with specific computer-executable instructions to:
process a second message transmitted by the second UE;
generate a second secure multicast message using the second message transmitted by the second UE and the security key; and
transmit a single copy of the second secure multicast message for reception by the first multicast router, wherein reception of the second secure multicast message causes the first multicast router to transmit the second secure multicast message to the first UE.

* * * * *